(12) United States Patent    (10) Patent No.:   US 12,576,899 B2

Peng et al.            (45) Date of Patent:   Mar. 17, 2026

(54) POWER-ASSISTED TROLLEY

(71) Applicant: MAKITA CORPORATION, Anjo (JP)

(72) Inventors: Shi Xuan Peng, Jiangsu (CN); Goh Yamamura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 351 days.

(21) Appl. No.: 18/322,880

(22) Filed: May 24, 2023

(65) Prior Publication Data

US 2023/0391389 A1     Dec. 7, 2023

(30) Foreign Application Priority Data

Jun. 1, 2022    (JP) ................................. 2022-089458

(51) Int. Cl.
     B62B 5/00         (2006.01)
     B62B 5/06         (2006.01)

(52) U.S. Cl.
     CPC ................ B62B 5/004 (2013.01); B62B 5/06 (2013.01)

(58) Field of Classification Search
     CPC .. B62B 5/004; B62B 5/06; B62B 3/02; B62B 2205/006; B62B 2205/26; B62B 3/022; B62B 5/067; B62B 5/0053; B62B 3/007; B62B 5/0069
     See application file for complete search history.

(56) References Cited

U.S. PATENT DOCUMENTS

| | | | | |
|---|---|---|---|---|
| 8,327,963 | B1 * | 12/2012 | Faulkingham ............ | B62B 3/04 180/9.1 |
| 10,377,403 | B2 * | 8/2019 | Lee ...................... | B60K 17/043 |
| 10,576,971 | B2 * | 3/2020 | Takeda ................ | B60L 15/2009 |
| 10,731,812 | B2 * | 8/2020 | Nashimoto .............. | B62B 3/12 |
| 11,299,188 | B2 * | 4/2022 | Yokoyama ............ | B62B 5/0096 |
| 11,970,199 | B2 * | 4/2024 | Wang .................... | B62B 3/1476 |
| 2017/0129522 | A1 * | 5/2017 | Lee ........................... | B60K 1/04 |
| 2018/0216793 | A1 * | 8/2018 | Nashimoto .......... | B60Q 1/0483 |
| 2018/0244294 | A1 * | 8/2018 | Ochiai .................... | B62B 5/004 |
| 2019/0023265 | A1 * | 1/2019 | Takeda ................. | B60W 10/18 |
| 2020/0073402 | A1 * | 3/2020 | Brucker .............. | G05D 1/0278 |
| 2020/0172140 | A1 * | 6/2020 | Yokoyama ........... | B62B 3/1412 |
| 2020/0346679 | A1 * | 11/2020 | Kim ........................ | B62B 5/004 |
| 2021/0039698 | A1 * | 2/2021 | Kato ........................ | B62B 5/06 |

(Continued)

FOREIGN PATENT DOCUMENTS

| | | | | | |
|---|---|---|---|---|---|
| CN | | 105946915 A | * | 9/2016 | ............. B62B 3/008 |
| CN | | 110641531 A | * | 1/2020 | ............... B62B 5/00 |

(Continued)

OTHER PUBLICATIONS

Translated DE-19723973-A1 (Year: 2025).*
Translated WO-2021024705-A1 (Year: 2025).*

*Primary Examiner* — James A Shriver, II

*Assistant Examiner* — Ian Bryce Shelton

(74) *Attorney, Agent, or Firm* — Oliff PLC

(57)            ABSTRACT

A power-assisted trolley includes: at least three wheels including a drive wheel; a cargo bed supported by the wheels; a handle including a grip portion extending in a left-right direction above a rear portion of the cargo bed; a motor configured to rotate the drive wheel; and a battery mounting portion configured to mount thereon a battery to supply power to the motor.

19 Claims, 33 Drawing Sheets

(56)            References Cited

U.S. PATENT DOCUMENTS

| | | | | |
|---|---|---|---|---|
| 2021/0039701 A1* | 2/2021 | Ifuku | ........................ | B62B 5/06 |
| 2021/0039702 A1* | 2/2021 | Kutsuna | .................... | B62B 3/08 |
| 2022/0297735 A1* | 9/2022 | Burnett | ................. | B62B 5/0006 |
| 2023/0089693 A1* | 3/2023 | Wang | ........................ | B62B 5/06 |
| | | | | 180/68.5 |

FOREIGN PATENT DOCUMENTS

| | | | | | |
|---|---|---|---|---|---|
| CN | 113715885 | A | * 11/2021 | ............. | B62B 5/004 |
| DE | 19723973 | A1 | * 3/1998 | ............. | B62B 1/002 |
| JP | 2006-290319 | A | 10/2006 | | |
| JP | 2012148610 | A | * 8/2012 | | |
| KR | 20110005641 | U | * 6/2011 | ........... | B62B 5/0053 |
| KR | 20110078314 | A | * 7/2011 | ........... | B62B 5/0006 |
| KR | 200485017 | Y1 | * 11/2017 | ........... | B62B 5/0033 |
| WO | WO-2021024705 | A1 | * 2/2021 | ........... | B62B 5/0053 |

* cited by examiner

UP

REAR ←→ FRONT

DOWN

FRONT

LEFT ←→ RIGHT

REAR

UP

FRONT

LEFT

RIGHT

REAR

DOWN

3A

18D

18

18B

18A

18E

2

18C

19

UP

REAR ← → FRONT

DOWN

POWER-ASSISTED TROLLEY

CROSS-REFERENCE

The present application claims priority to and incorporates by reference the entire contents of Japanese Patent Application No. 2022-089458 filed in Japan on Jun. 1, 2022.

TECHNICAL FIELD

The technology disclosed in the present specification relates to a power-assisted trolley.

BACKGROUND ART

In the technical field related to a power-assisted trolley, there is known a power-assisted hand-pushed trolley as disclosed in JP 2006-290319 A.

In JP 2006-290319 A, a power-assisted trolley includes a rechargeable battery. When the rechargeable battery is fixed to the power-assisted trolley, it is difficult to use the power-assisted trolley during charging of the rechargeable battery, which causes deterioration in convenience.

An object of the present disclosure is to suppress deterioration in convenience of a power-assisted trolley.

SUMMARY OF THE INVENTION

In one non-limiting aspect of the present disclosure, a power-assisted trolley may include: at least three wheels including a drive wheel; a cargo bed supported by the wheels; a handle including a grip portion extending in a left-right direction above a rear portion of the cargo bed;

a motor configured to rotate the drive wheel; and a battery mounting portion configured to mount thereon a battery to supply power to the motor.

DETAILED DESCRIPTION OF THE INVENTION

Figure 1:
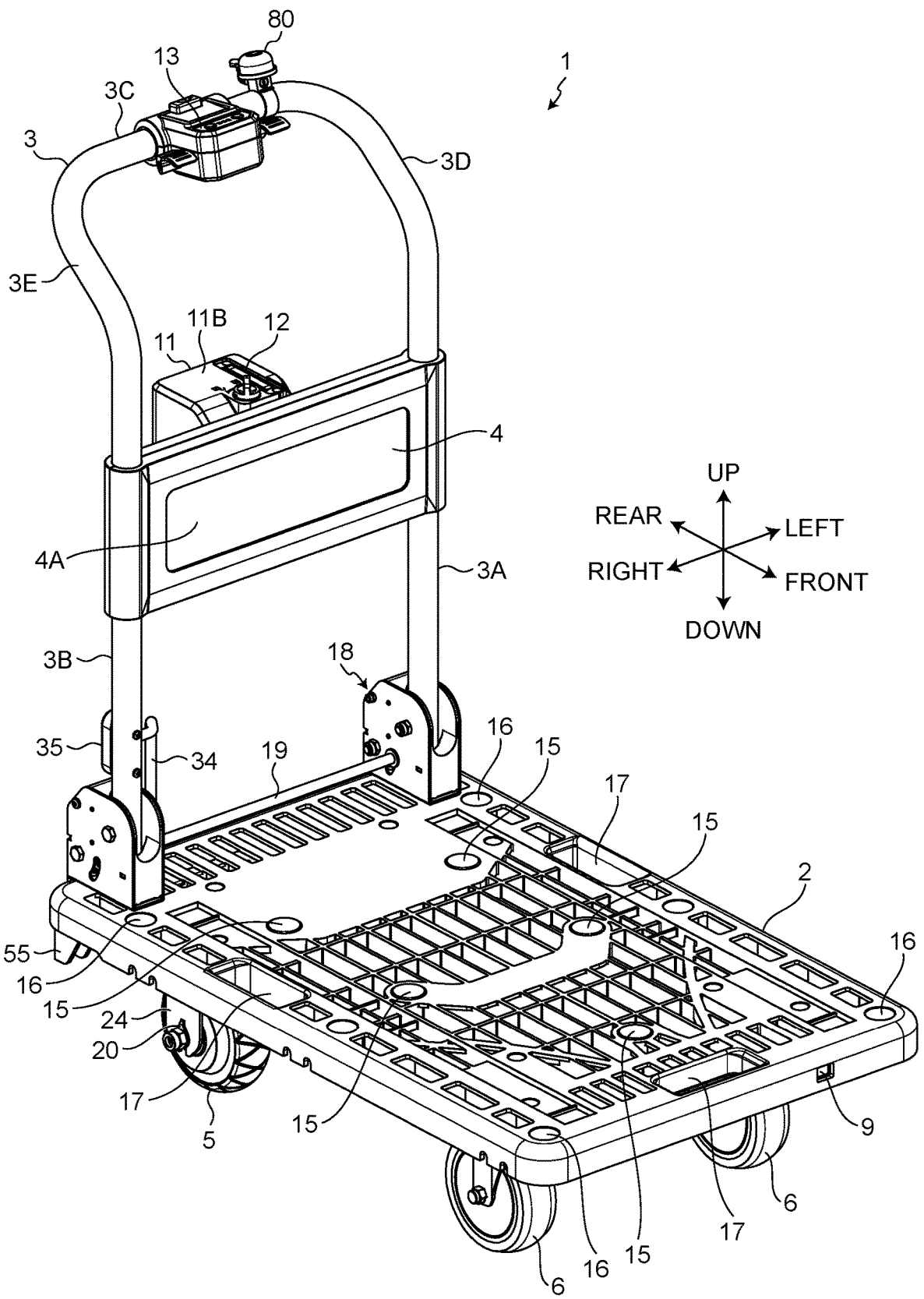
FIG. 1 is a perspective view, viewed from the front, illustrating a power-assisted trolley according to an embodiment.

In one or more embodiments, an power-assisted trolley may include: at least three wheels including a drive wheel; a cargo bed supported by the wheels; a handle having a grip portion extending in the left-right direction above a rear portion of the cargo bed; a motor configured to rotate the drive wheel; and a battery mounting portion configured to mount thereon a battery to supply power to the motor.

In the above-described configuration, since the battery that supplies power to the motor is attached to and detached from the battery mounting portion, for example, when the remaining capacity amount of the battery runs out, a user can continue to use the power-assisted trolley by mounting another battery on the battery mounting portion. In addition, the battery for the electric tool is easily attached to and detached from the battery mounting portion. Therefore, deterioration in convenience of the power-assisted trolley is suppressed. One of the three wheels may be a front wheel and the remaining two wheels may be rear wheels, or two of the three wheels may be front wheels and the remaining one wheel may be a rear wheel. One of the three wheels may be a drive wheel, or two wheels may be drive wheels. The number of wheels may be four. Among the four wheels, two front wheels may be drive wheels, or two rear wheels may be drive wheels.

In one or more embodiments, the battery mounting portion may be disposed upward of the cargo bed.

In the above-described configuration, since the battery mounting portion is disposed at a high position, a user can smoothly attach and detach the battery to and from the battery mounting portion.

In one or more embodiments, the power-assisted trolley may include a left column portion and a right column portion each extending upward from the rear portion of the cargo bed. The battery mounting portion may be disposed between a left column portion and a right column portion.

In the above-described configuration, since the battery mounting portion is disposed at the central portion of the power-assisted trolley in the left-right direction, the user can smoothly attach and detach the battery to and from the battery mounting portion.

In one or more embodiments, the power-assisted trolley may include a back plate disposed between the left column portion and the right column portion. The battery mounting portion may be provided at a rear portion of the back plate.

In the above-described configuration, since the battery mounting portion is disposed at the rear portion of the back plate, the user can smoothly attach and detach the battery to and from the battery mounting portion.

In one or more embodiments, the power-assisted trolley may include a battery case configured to house the battery mounting portion. The battery case may be fixed to a rear surface of the back plate.

In the above-described configuration, the battery mounting portion and the battery are protected by the battery case.

In one or more embodiments, the battery case may include: a case body fixed to the rear surface of the back plate; and a case cover configured to open and close an opening provided in an upper portion of the case body. The battery mounting portion may be disposed on an inner surface of the case body.

In the above-described configuration, the user can smoothly attach and detach the battery to and from the battery mounting portion through the opening provided in the upper portion of the case body. In addition, since the opening provided in the upper portion of the case body is closed by the case cover, the battery mounting portion and the battery are protected by the battery case.

In one or more embodiments, the battery mounting portion may be disposed inside the case body so as to face rearward.

In the above-described configuration, the user can smoothly attach and detach the battery to and from the battery mounting portion.

In one or more embodiments, the battery mounting portion may guide the battery in an up-down direction. The battery may be mounted on the battery mounting portion by inserting the battery into the battery mounting portion from above the battery mounting portion through the opening of the case body.

In the above-described configuration, the user can smoothly attach and detach the battery to and from the battery mounting portion.

In one or more embodiments, the power-assisted trolley may include a locking member configured to lock the case body and the case cover.

In the above-described configuration, for example, unintentional opening of the case cover during use of the power-assisted trolley is suppressed.

In one or more embodiments, the locking member may include: a shaft rotatably supported by the case cover; a hook provided at a lower end portion of the shaft; and a dial disposed on an upper surface of the case cover. When the dial is rotated in one direction in a state where the opening of the case body is closed by the case cover, the hook may be allowed to enter a recess provided inside the case body so as to lock the case body and the case cover.

In the above-described configuration, the user can easily lock the case body and the case cover only by operating the dial.

In one or more embodiments, the power-assisted trolley may include a controller configured to control the motor. The controller may be disposed in a housing portion provided in the cargo bed.

In the above configuration, the controller is protected by the cargo bed.

In one or more embodiments, the housing portion may be provided so as to be recessed upward from the lower surface of the cargo bed. The power-assisted trolley may include a controller cover configured to close an opening provided in the lower portion of the housing portion in a state where the controller is disposed in the housing portion.

In the above-described configuration, the controller is protected by the controller cover.

In one or more embodiments, the controller cover may be fixed to the cargo bed with screws.

In the above-described configuration, the controller cover is prevented from separating from the cargo bed.

In one or more embodiments, the controller cover may have a vent.

In the above-described configuration, the controller is cooled by air flowing into the housing portion from the vent.

In one or more embodiments, the power-assisted trolley may include a flexible tube that connects at least one of the left column portion and the right column portion to the cargo bed. The battery may supply power to the motor via the controller. At least a part of a battery cable that connects the battery mounting portion to the controller may be disposed in an interior space of the flexible tube.

In the above-described configuration, the handle can be folded in a state where the connection between the battery mounting portion and the controller by the battery cable is maintained.

In one or more embodiments, the motor may be an in-wheel motor disposed inside the drive wheel.

In the above-described configuration, for example, a gear mechanism configured to transmit a rotational force of the motor to the drive wheel can be omitted.

In one or more embodiments, the power-assisted trolley may include a cable housing member configured to connect the cargo bed to the drive wheel. At least a part of a motor cable that connects the controller to the motor may be disposed in an interior space of the cable housing member.

In the above-described configuration, the motor cable is protected by the cable housing member.

In one or more embodiments, the power-assisted trolley may include a headlight that emits light by the power supplied from the battery.

In the above-described configuration, the user can use the power-assisted trolley in a dark place.

In one or more embodiments, the headlight may be disposed on the front surface of the cargo bed.

In the above-described configuration, the front of the cargo bed is illuminated by the headlight.

In one or more embodiments, the power-assisted trolley may include a taillight that emits light by the power supplied from the battery.

In the above-described configuration, the position of the power-assisted trolley can be easily visually recognized from the rear side of the power-assisted trolley.

Hereinafter, embodiments according to the present disclosure will be described with reference to the drawings, but the present disclosure is not limited to the embodiments. The components of the embodiments described below can be appropriately combined. In addition, some components may not be used.

In the embodiment, the positional relationships among parts will be described using terms of "front", "rear", "left", "right", "up", and "down". These terms indicate the relative positions or directions, using the center of a power-assisted trolley 1 as a reference.

Outline of Power-Assisted Trolley

Figure 2:
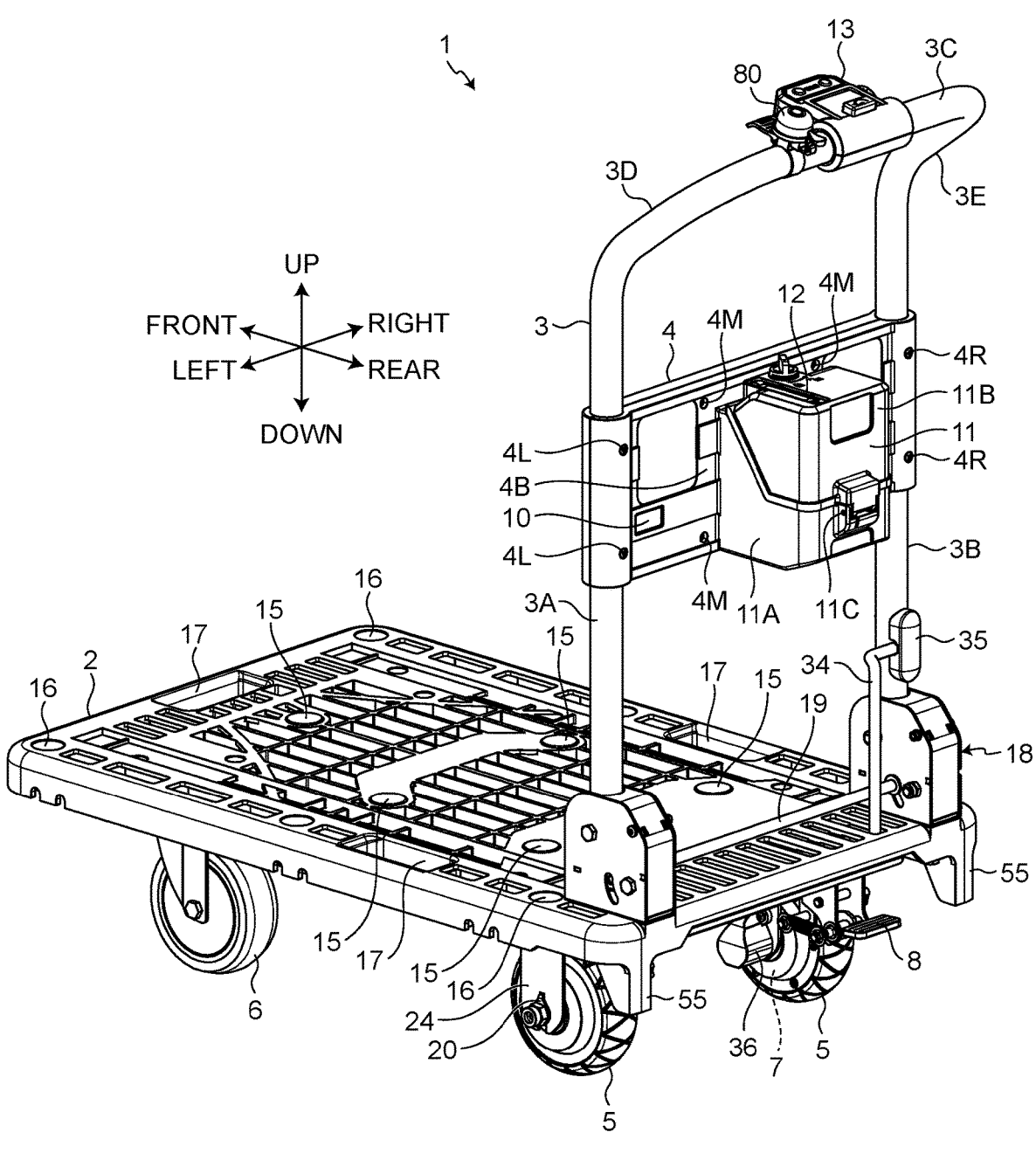
FIG. 2 is a perspective view, viewed from the rear, illustrating the power-assisted trolley according to the embodiment.
Figure 3:
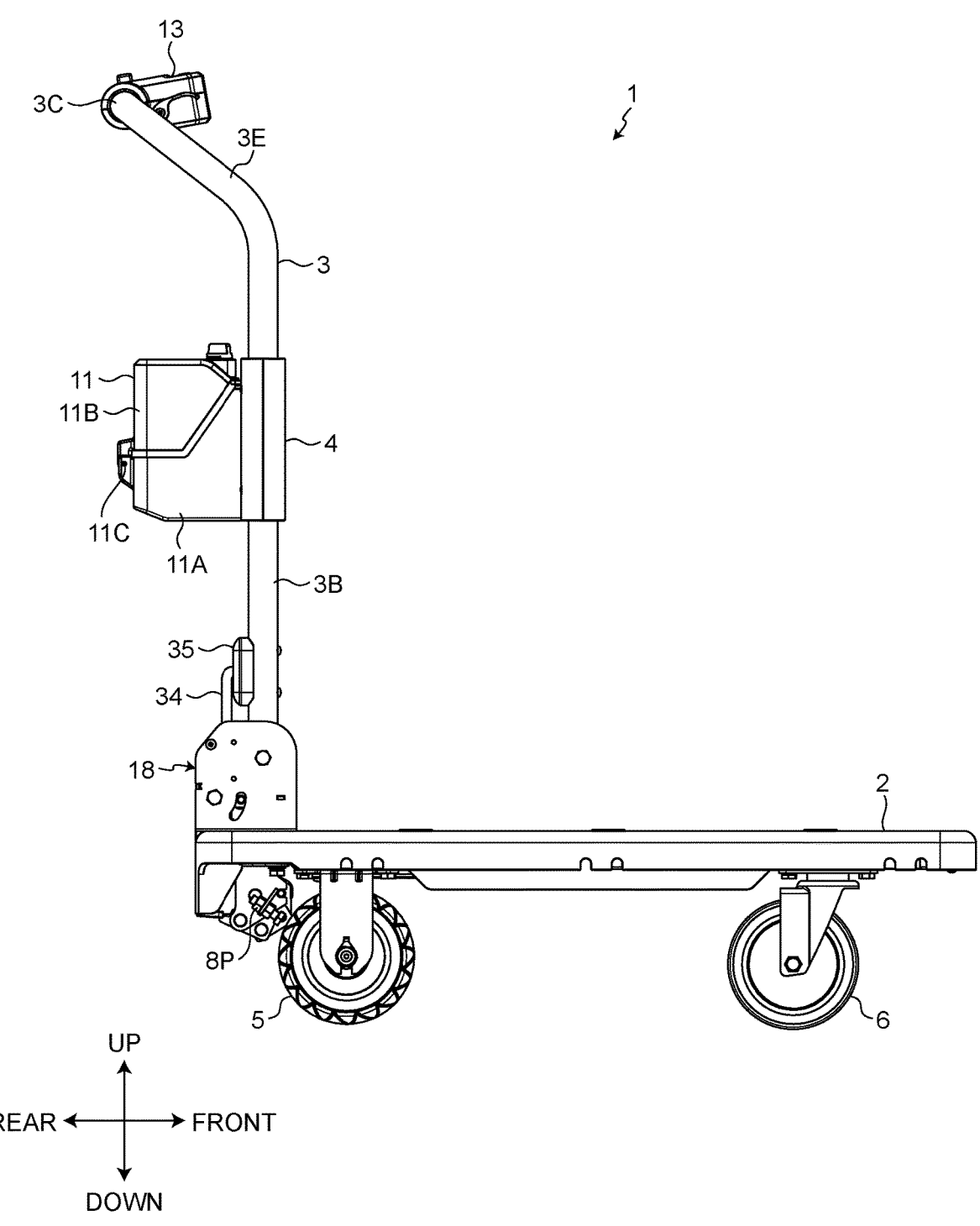
FIG. 3 is a view of the power-assisted trolley according to the embodiment as viewed from the right side.
Figure 4:
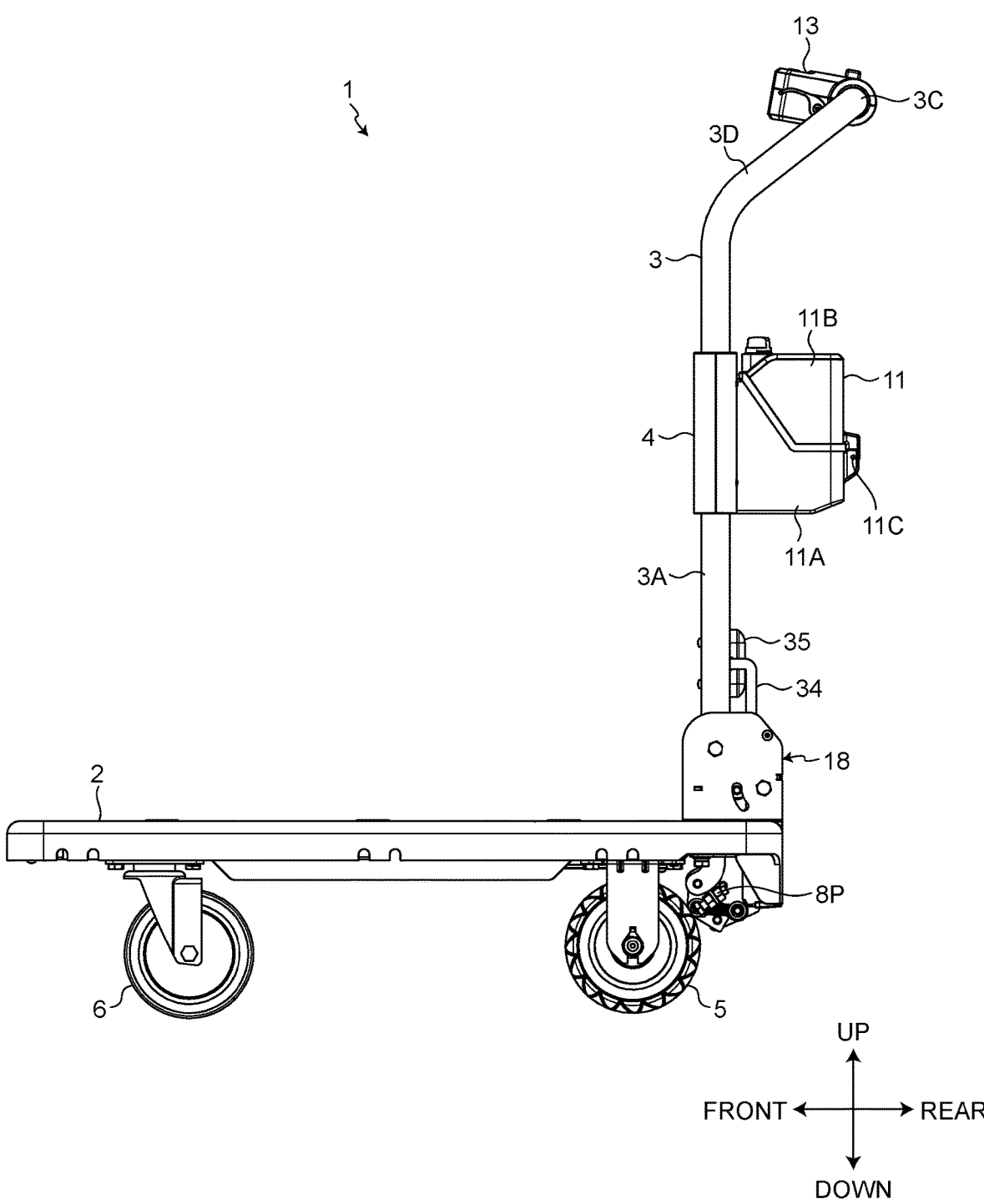
FIG. 4 is a view of the power-assisted trolley according to the embodiment as viewed from the left side.
Figure 5:
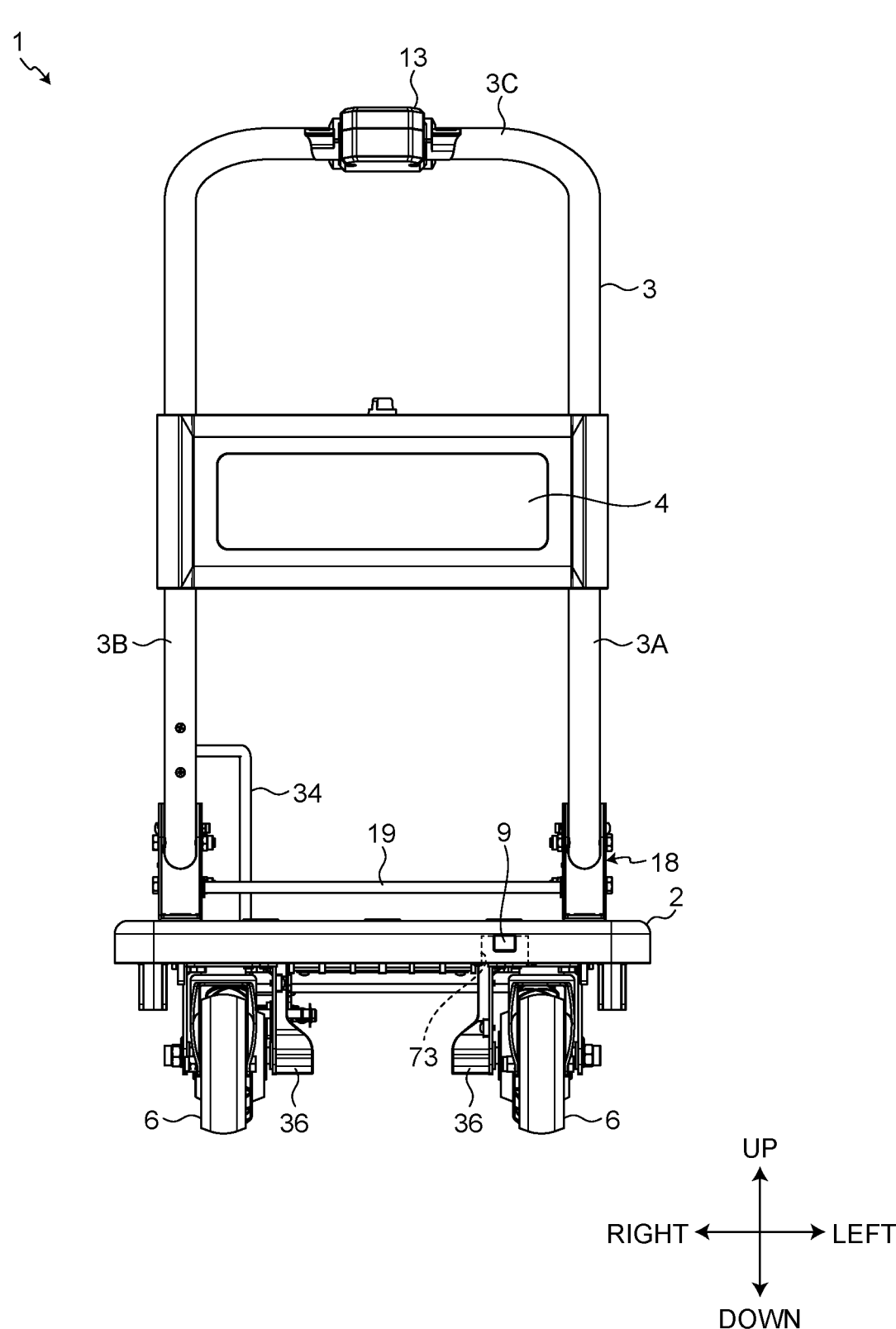
FIG. 5 is a view of the power-assisted trolley according to the embodiment as viewed from the front side.
Figure 6:
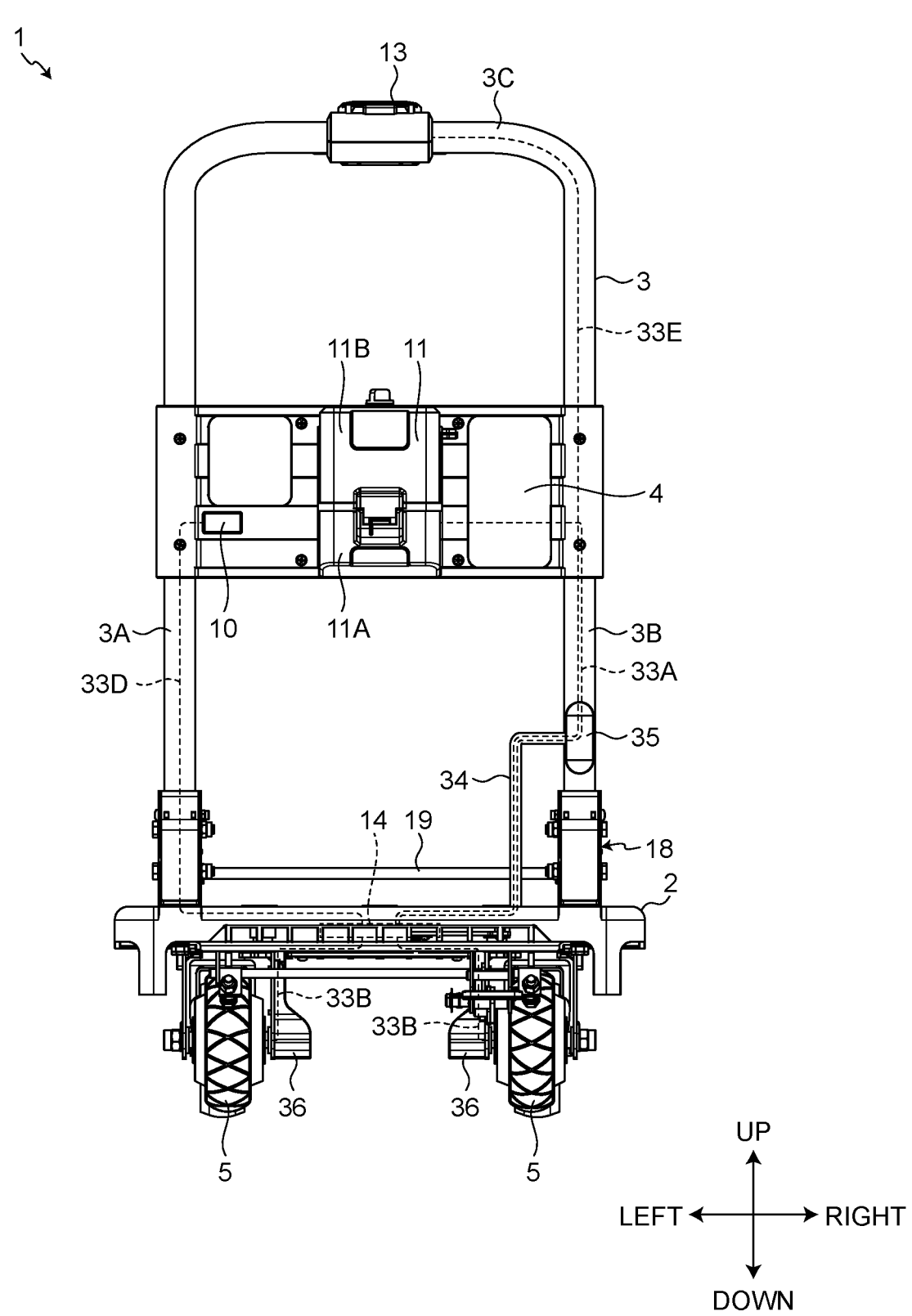
FIG. 6 is a view of the power-assisted trolley according to the embodiment as viewed from the rear side.
Figure 7:
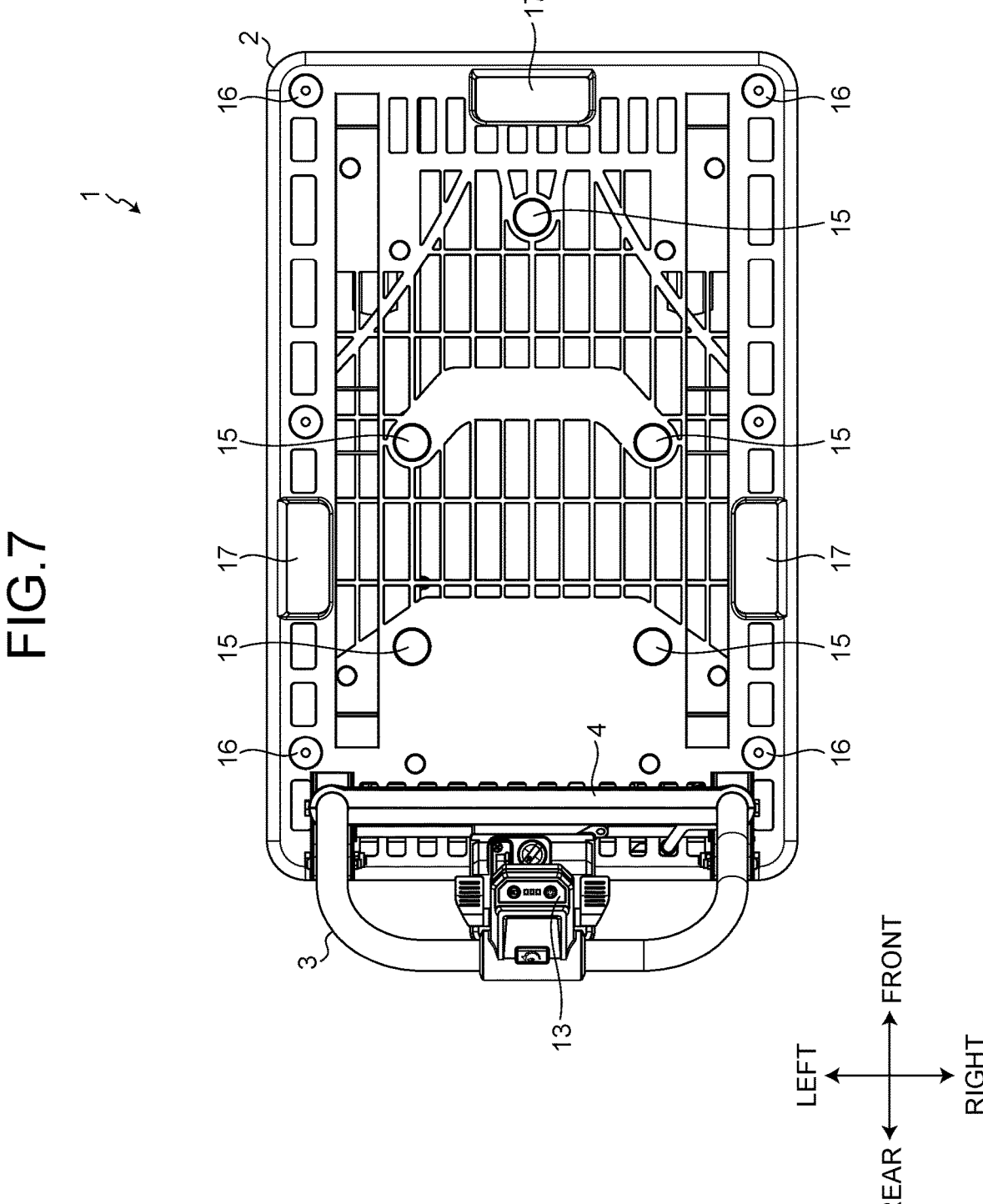
FIG. 7 is a view of the power-assisted trolley according to the embodiment as viewed from above.
Figure 8:
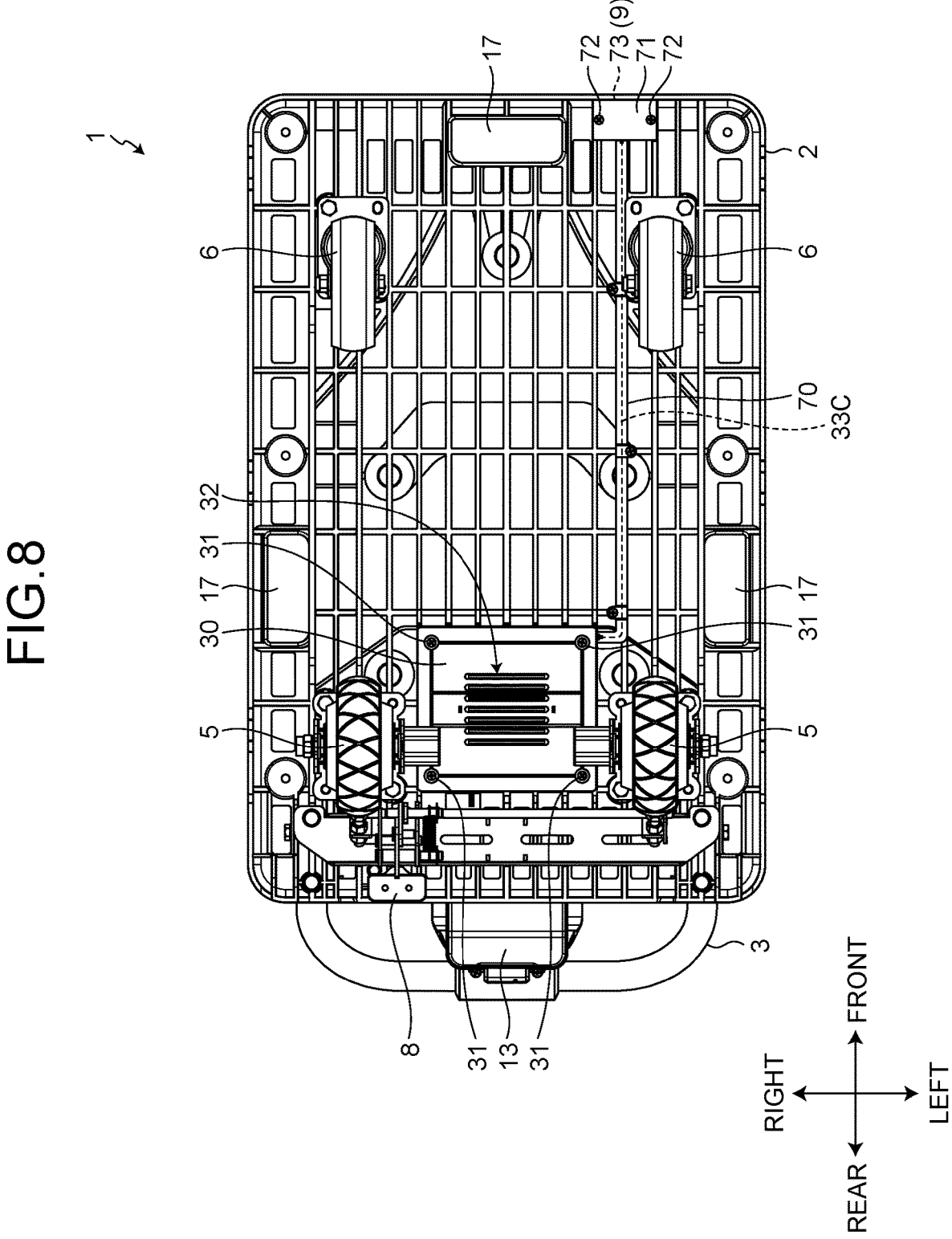
FIG. 8 is a view of the power-assisted trolley according to the embodiment as viewed from below.
Figure 9:
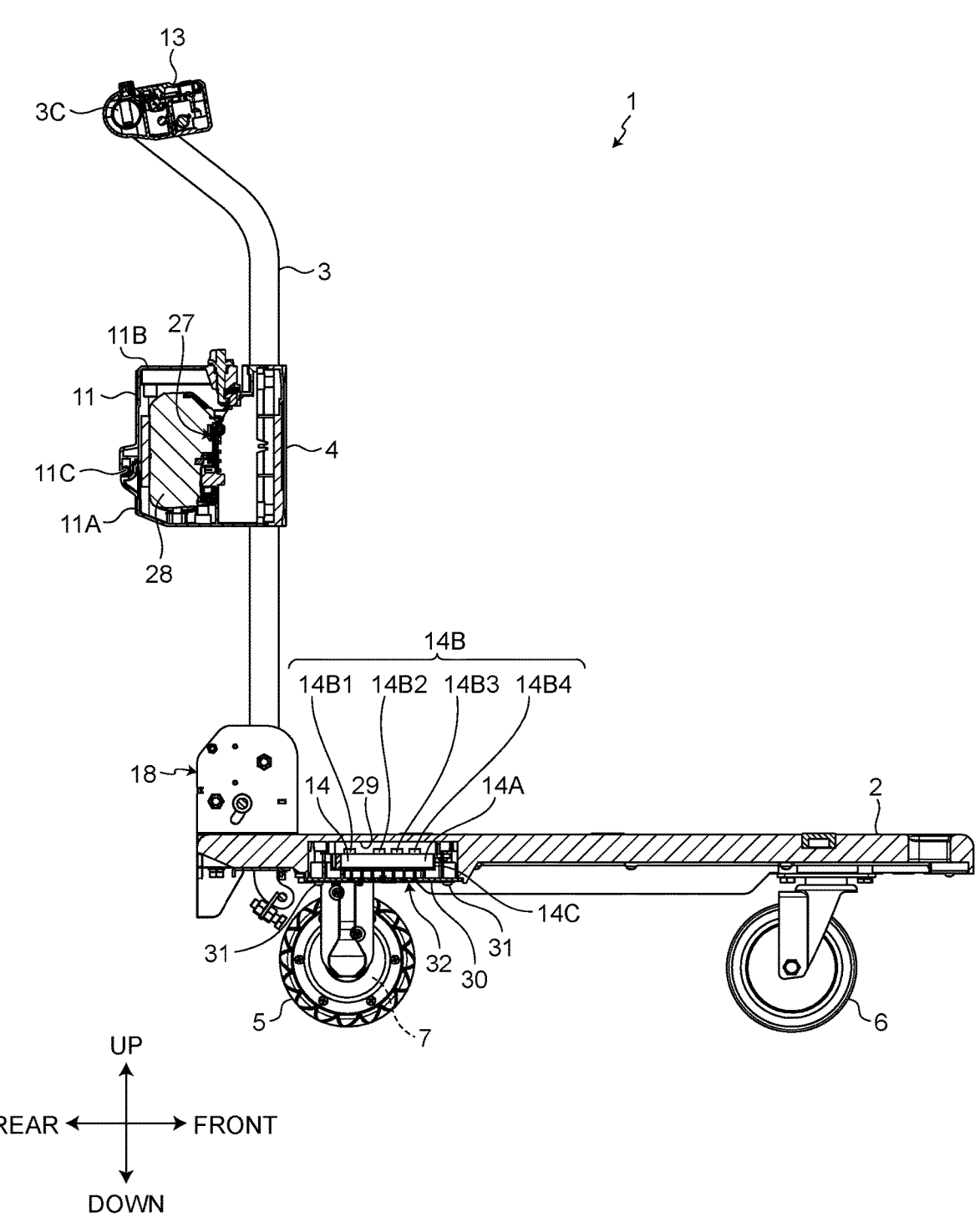
FIG. 9 is a cross-sectional view illustrating the power-assisted trolley according to the embodiment.

FIG. 1 is a front perspective view illustrating the power-assisted trolley 1 according to an embodiment. FIG. 2 is a rear perspective view illustrating the power-assisted trolley 1 according to the embodiment. FIG. 3 is a view of the power-assisted trolley 1 according to the embodiment as viewed from the right side. FIG. 4 is a view of the power-assisted trolley 1 according to the embodiment as viewed from the left side. FIG. 5 is a view of the power-assisted trolley 1 according to the embodiment as viewed from the front side. FIG. 6 is a view of the power-assisted trolley 1 according to the embodiment as viewed from the rear side. FIG. 7 is a view of the power-assisted trolley 1 according to the embodiment as viewed from above. FIG. 8 is a view of the power-assisted trolley 1 according to the embodiment as viewed from below. FIG. 9 is a cross-sectional view illustrating the power-assisted trolley 1 according to the embodiment.

The power-assisted trolley 1 is used, for example, to carry a cargo in a factory. The power-assisted trolley 1 assists a force with which a user pushes the power-assisted trolley 1 by a rotational force generated by a motor 7 to be described later. Alternatively, the power-assisted trolley 1 may travel by the rotational force generated by the motor 7 without being pushed by the user. The power-assisted trolley 1 is capable of perform assisted traveling to assist the user by generating the rotational force of the motor 7. The power-assisted trolley 1 can also perform non-assisted traveling without generating the rotational force of the motor 7. The user can also use the power-assisted trolley 1 as a hand-pushed trolley.

The power-assisted trolley 1 includes a cargo bed 2, a handle 3, a back plate 4, at least three wheels including a drive wheel 5 and a universal wheel 6, motors 7, a parking brake pedal 8, a headlight 9, a taillight 10, a battery case 11, an inclination meter unit 12, an operating device 13, and a controller 14.

The cargo bed 2 supports a cargo from below. The cargo is placed on the upper surface of the cargo bed 2. The cargo bed 2 is practically plate-shaped. The outer shape of the cargo bed 2 is substantially rectangular. Rubber pads 15 are disposed at a plurality of positions on the upper surface of the cargo bed 2. Since the cargo comes into contact with the rubber pad(s) 15, the cargo is prevented from longitudinally and laterally slipping on the cargo bed 2. On the upper surface of the cargo bed 2, a plurality of recesses 16 into which leg portions 61 of a table 60 described later are respectively inserted are provided. A handle opening 17 into which a user can insert the user's hand is provided in each of the left portion, the right portion, and the front portion of the cargo bed 2. The user can carry the power-assisted trolley 1 by inserting the user's hand into the handle opening 17.

The handle 3 is connected to the rear portion of the cargo bed 2 via a pair of connection mechanisms 18. The handle 3 includes: a left column portion 3A extending upward from the left portion of the rear portion of the cargo bed 2; a right column portion 3B extending upward from the right portion of the rear portion of the cargo bed 2; a grip portion 3C extending in the left-right direction above the left column portion 3A and the right column portion 3B; a left connection portion 3D connecting an upper end portion of the left column portion 3A to a left end portion of the grip portion 3C; and a right connection portion 3E connecting an upper end portion of the right column portion 3B to a right end portion of the grip portion 3C. The grip portion 3C is disposed upward and rearward of the left column portion 3A and the right column portion 3B. The grip portion 3C is held by a user. The user applies, while gripping the handle 3, a driving force to the power-assisted trolley 1 so that the power-assisted trolley 1 moves. Each of the left connection portion 3D and the right connection portion 3E is inclined rearward and upward.

As illustrated in FIGS. 1 and 2, a bell 80 is mounted on the handle 3. In the embodiment, the bell 80 is mounted on the grip portion 3C on the left side of the operating device 13. The bell 80 may be mounted on the grip portion 3C on the right side of the operating device 13, or may be mounted on at least one of the left connection portion 3D, the right connection portion 3E, the left column portion 3A, and the right column portion 3B. The user can notify, by sounding the bell 80, a person(s) around the power-assisted trolley 1 of the presence of the power-assisted trolley 1. For convenience, the bell 80 is illustrated only in FIGS. 1 and 2.

The pair of connection mechanisms 18 supports a lower end portion of the handle 3 with respect to the cargo bed 2 such that the handle 3 is allowed to rotate. The handle 3 rotates so as to change between a used state and a folded state. The used state is a state in which the left column portion 3A and the right column portion 3B are disposed so as to extend upward from the cargo bed 2. The folded state is a state in which the grip portion 3C is rotated so as to approach the upper surface of the cargo bed 2. The pair of connection mechanisms 18 locks the handle 3 in the used state of the handle 3, thereby making it possible to prevent rotation of the handle 3. The pair of connection mechanisms 18 has a folding bar 19. When the folding bar 19 is moved downward by the user, the lock of the handle 3 is released, and the handle 3 can be rotated so as to change from the used state to the folded state.

The back plate 4 is configured to support the cargo placed on the cargo bed 2 from behind. The back plate 4 is disposed between the left column portion 3A and the right column portion 3B. A left end portion of the back plate 4 is fixed to the left column portion 3A. A right end portion of the back plate 4 is fixed to the right column portion 3B. The back plate 4 includes a front plate 4A and a rear plate 4B. A left end portion of the front plate 4A and a left end portion of the rear plate 4B are fixed by a plurality of left screws 4L via the left column portion 3A in a state where the left column portion 3A is sandwiched between the left end portion of the front plate 4A and the left end portion of the rear plate 4B in the front-rear direction. A right end portion of the front plate 4A and a right end portion of the rear plate 4B are fixed by a plurality of right screws 4R via the right column portion 3B in a state where the right column portion 3B is sandwiched between the right end portion of the front plate 4A and the right end portion of the rear plate 4B in the front-rear direction. A central portion of the front plate 4A and a central portion of the rear plate 4B are fixed by a plurality of middle screws 4M. As a result, the left end portion of the back plate 4 is fixed to the left column portion 3A, and the right end portion of the back plate 4 is fixed to the right column portion 3B.

The drive wheels 5 and the universal wheels 6 support the cargo bed 2 from below. The drive wheels 5 are disposed at the rear portion of the cargo bed 2. Two drive wheels 5 are provided with a gap therebetween in the left-right direction. The drive wheels 5 are rotated by a rotational force generated by the motors 7. The universal wheels 6 are disposed in front of the drive wheels 5. Two universal wheels 6 are provided with a gap therebetween in the left-right direction.

In the embodiment, the drive wheels 5 are rear wheels of the power-assisted trolley 1, and the universal wheels 6 are a front wheels of the power-assisted trolley 1. The drive wheels 5 are fixed wheels, and the direction of the rotary shaft of each of the drive wheels 5 is constant with respect to the cargo bed 2. The direction of the rotary shaft of each of the universal wheels 6 is movable with respect to the cargo bed 2. That is, tires of the drive wheels 5 always extend in the front-rear direction, and tires of the universal wheels 6 are rotatable in the front-rear direction or the left-right direction.

The motors 7 are electric motors. The motors 7 cause the drive wheels 5 to rotate. The drive wheels 5 are rotated by a rotational force generated by the motors 7.

Figure 11:
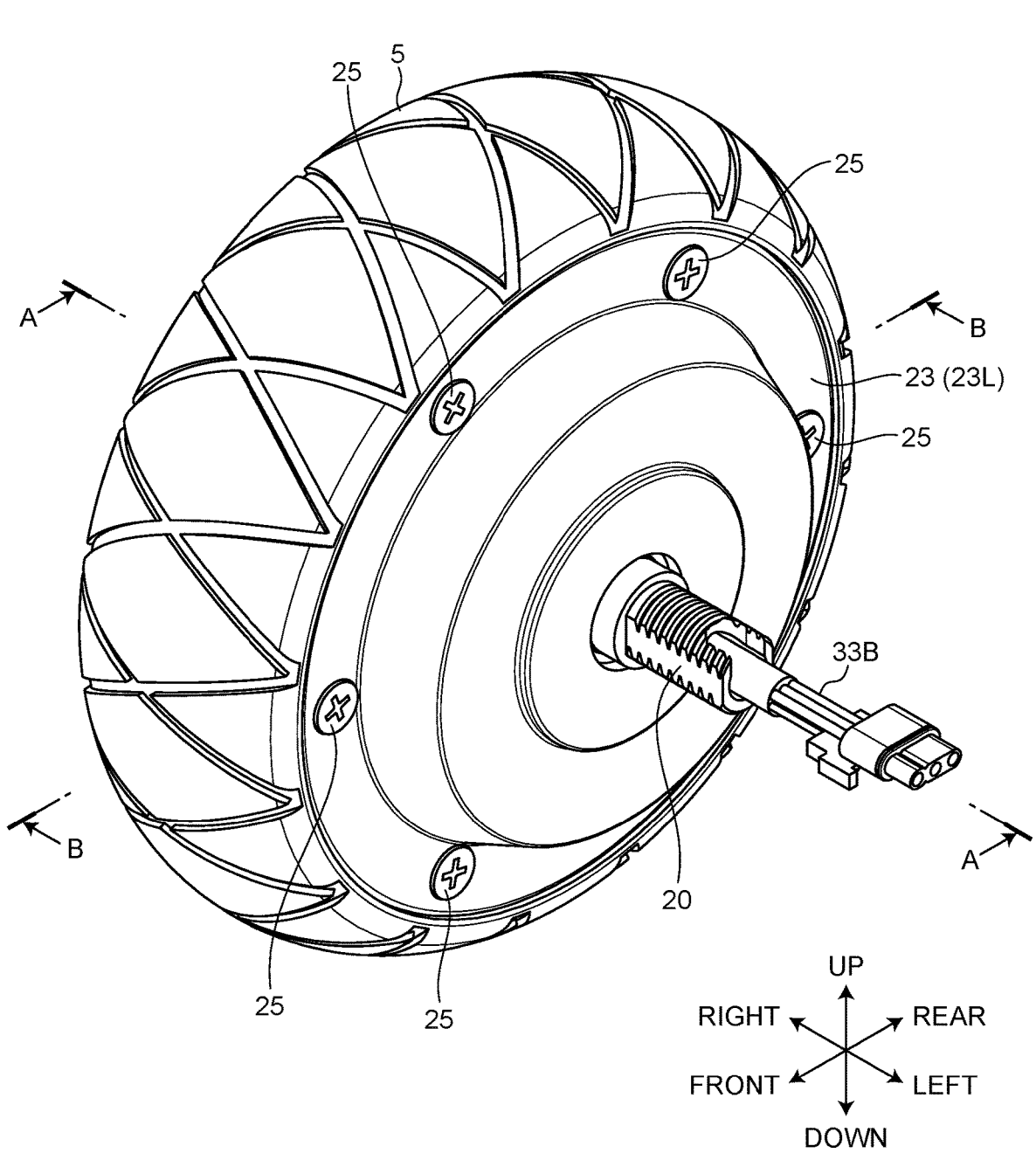
FIG. 11 is a front perspective view illustrating a drive wheel according to the embodiment.
Figure 12:
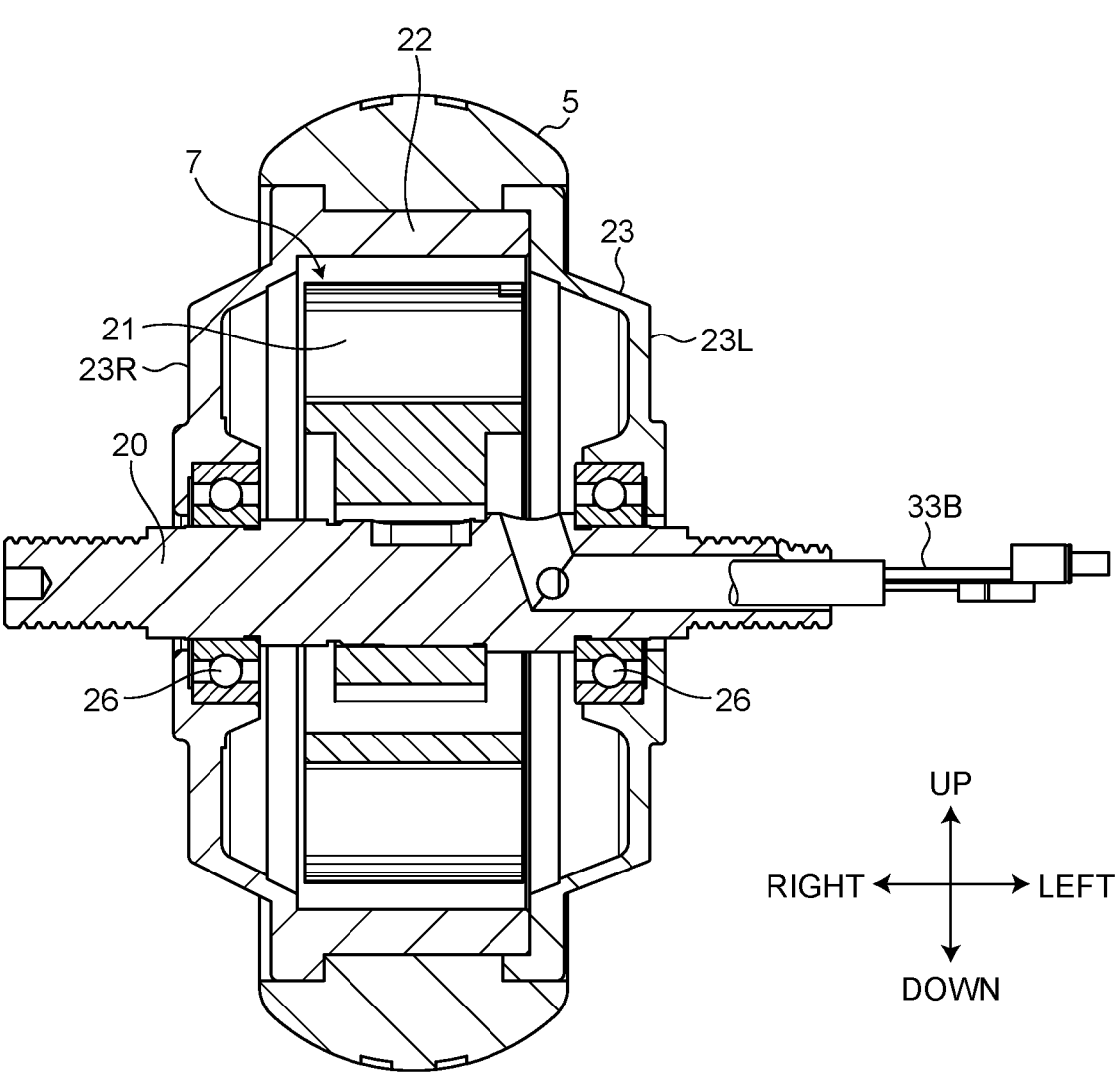
FIG. 12 is a cross-sectional view illustrating the drive wheel according to the embodiment.
Figure 13:
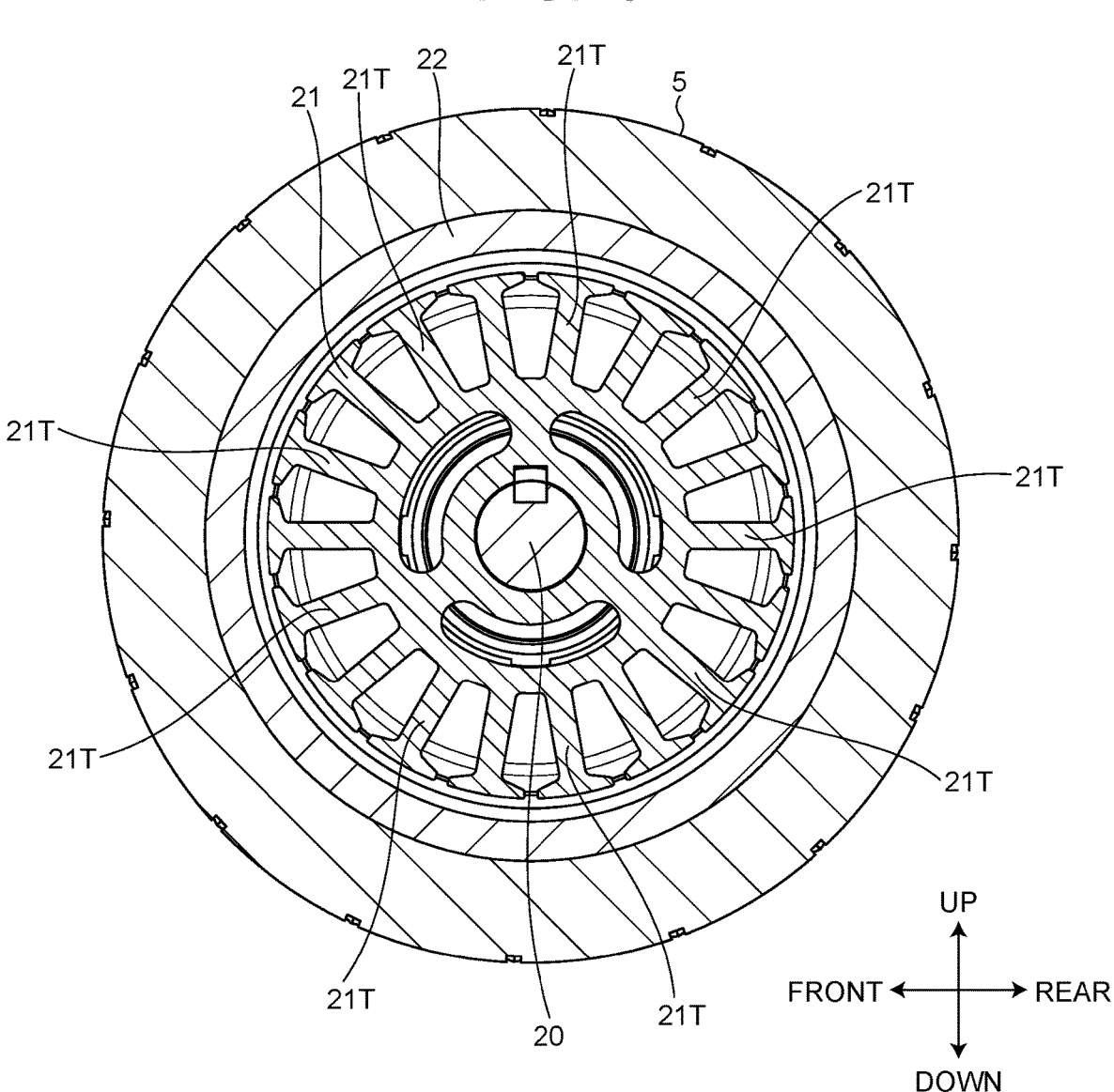
FIG. 13 is a cross-sectional view illustrating the drive wheel according to the embodiment.

FIG. 11 is a front perspective view illustrating the drive wheel 5 according to the embodiment. FIG. 12 is a cross-sectional view illustrating the drive wheel 5 according to the embodiment and corresponds to a cross-sectional arrow view taken along line A-A in FIG. 11. FIG. 13 is a cross-sectional view illustrating the drive wheel 5 according to the embodiment and corresponds to a cross-sectional arrow view taken along line B-B in FIG. 11.

In the embodiment, the motors 7 are respectively disposed inside the drive wheels 5. The motors 7 are so-called in-wheel motors. Each of the motors 7 includes a stator 21 disposed around a shaft 20, a rotor 22 disposed around the stator 21, and a housing 23. As illustrated in FIGS. 1 and 2, the shaft 20 is supported by a bracket 24 fixed to the lower surface of the cargo bed 2. The stator 21 is fixed to the shaft 20. The stator 21 has a plurality of teeth 21T. Coils (not illustrated) are respectively wound around the teeth 21T. The housing 23 houses the stator 21 and the rotor 22. The housing 23 includes a left housing 23L and a right housing 23R. In the left-right direction, the rotor 22 is disposed between the left housing 23L and the right housing 23R. The left housing 23L and the right housing 23R are fixed by a plurality of screws 25. The housing 23 is rotatably supported by the shaft 20 via a bearing 26. The drive wheel 5 is fixed to the housing 23.

The parking brake pedal 8 is operated to lock the drive wheels 5. The user can move the parking brake pedal 8 downward by depressing the parking brake pedal 8 with his/her foot. When the parking brake pedal 8 is moved downward, parking brake pins 8P come into contact with the tires of the drive wheels 5, whereby the drive wheels 5 are locked and the drive wheels 5 become non-rotatable. When the parking brake pedal 8 is moved upward, the lock of the drive wheels 5 is released, and the drive wheels 5 become rotatable.

The headlight 9 is disposed on the left side of the front surface of the cargo bed 2. The headlight 9 illuminates the front of the cargo bed 2. The headlight 9 outputs white light. The headlight 9 allows the user to smoothly use the power-assisted trolley 1 even in a dark warehouse or the like.

The taillight 10 is disposed on the left side of the rear plate 4B of the back plate 4. The taillight 10 outputs red light.

The battery case 11 houses a battery mounting portion 27 and a battery 28 mounted on the battery mounting portion 27. The battery case 11 is disposed above the cargo bed 2. The battery case 11 is disposed between the left column portion 3A and the right column portion 3B. The battery case 11 is fixed to the rear surface of the back plate 4. The battery case 11 includes a case body 11A formed to be integrated with the rear plate 4B and a case cover 11B configured to open and close an opening provided in the upper portion of the case body 11A. The case cover 11B is rotatably supported by the case body 11A via a hinge 11C. The hinge 11C connects the rear portion of the case body 11A to the rear portion of the case cover 11B. When the case cover 11B rotates rearward, the opening of the case body 11A is opened.

The battery mounting portion 27 is disposed on the inner surface of the case body 11A. The battery mounting portion 27 is disposed inside the case body 11A so as to face rearward. The battery mounting portion 27 is a separate body from the case body 11A. The battery mounting portion 27 is fixed to the case body 11A.

The battery 28 is a battery for an electric tool. The battery 28 can also be used as a power source of the electric tool. Examples of the electric tool include an impact driver, an impact wrench, a driver drill, an angle drill, a hammer drill, a circular saw, and a light. The battery 28 supplies power to at least the motors 7 in a state of being mounted on the battery mounting portion 27. The battery 28 supplies power to an electric device(s) or an electronic device(s) mounted on the power-assisted trolley 1 in a state of being mounted on the battery mounting portion 27. The electric device or the electronic device supplied with power from the battery 28 includes the headlight 9 and the taillight 10. The battery 28 includes a lithium ion battery. The battery 28 is a rechargeable battery that can be charged. The battery mounting portion 27 has the same structure as that of the battery mounting portion of the electric tool. The battery 28 is detachable from the battery mounting portion 27. The battery 28 is charged by an external charger.

The user of the power-assisted trolley 1 can perform work of mounting the battery 28 on the battery mounting portion 27 and work of removing the battery 28 from the battery mounting portion 27. The battery mounting portion 27 includes a guide member that guides the battery 28 in the up-down direction, and a body terminal connected to a battery terminal provided in the battery 28. The user can mount the battery 28 on the battery mounting portion 27 by inserting the battery 28 into the battery mounting portion 27 from above the battery mounting portion 27 through the opening of the case body 11A. The battery 28 is inserted into the battery mounting portion 27 while being guided by the guide member. When the battery 28 is mounted on the battery mounting portion 27, the battery terminal of the battery 28 and the body terminal of the battery mounting portion 27 are electrically connected to each other. The user of the power-assisted trolley 1 can remove the battery 28 from the battery mounting portion 27 by moving the battery 28 upward.

Figure 10:
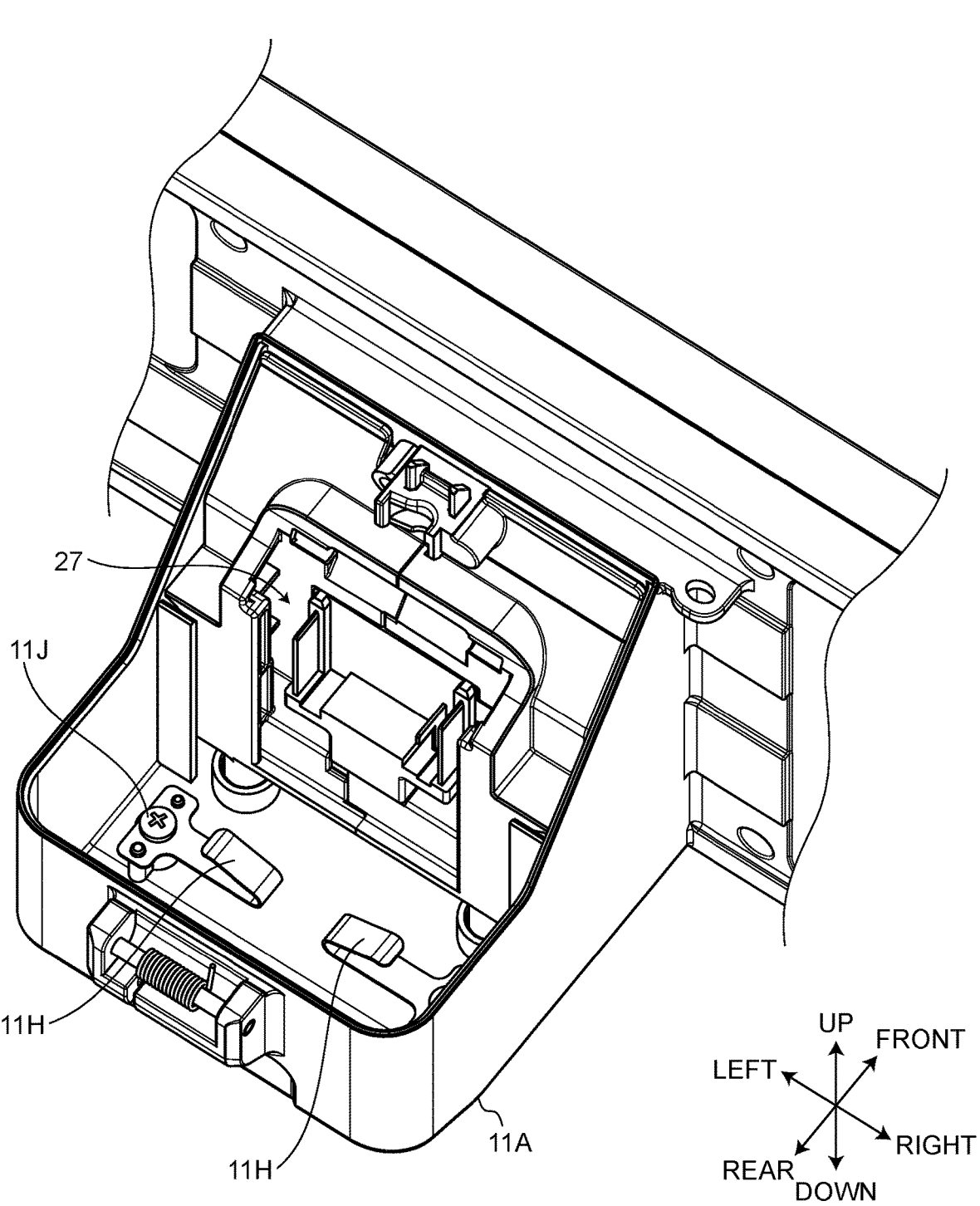
FIG. 10 is a perspective view illustrating a case body according to the embodiment.

FIG. 10 is a perspective view illustrating the case body 11A according to the embodiment. As illustrated in FIG. 10, a pair of leaf springs 11H is disposed on a bottom surface of the case body 11A. A part of each of the leaf springs 11H is fixed to the bottom surface of the case body 11A by a screw 11J. The leaf springs 11H generate an elastic force so that the battery 28 mounted on the battery mounting portion 27 moves upward. When a hook provided on the battery 28 is released to remove the battery 28 from the battery mounting portion 27, the battery 28 moves upward by the elastic force of the leaf springs 11H. As a result, the user can easily remove the battery 28.

The inclination meter unit 12 includes an inclination meter 38 that measures an inclination angle of the cargo bed 2 in the front-rear direction with respect to the horizontal plane. In the embodiment, the inclination meter 38 is a so-called bubble tube (bubble level).

The operating device 13 is provided on the grip portion 3C. The operating device 13 is operated to start the motors 7. The operating device 13 is operated to adjust the rotational speed of the motors 7. The operating device 13 is operated to activate the headlight 9 and the taillight 10.

The controller 14 controls at least the motors 7. The controller 14 controls the headlight 9 and the taillight 10. The control of the headlight 9 and the taillight 10 includes turn-on control and turn-off control. The controller 14 includes a circuit board 14A and a plurality of electronic components 14B mounted on the circuit board 14A. The circuit board 14A is housed in a controller case 14C. Examples of the electronic components 14B include a microcomputer 14B1, a ROM 14B2, a RAM 14B3, and a switching element 14B4. An MOSFET is exemplified as the switching element 14B4. The controller 14 is disposed in the cargo bed 2. In the embodiment, the controller 14 is disposed in a housing portion 29 provided in the cargo bed 2. The housing portion 29 is provided so as to be recessed upward from the lower surface of the cargo bed 2. In a state where the controller 14 is disposed in the housing portion 29, an opening provided in the lower portion of the housing portion 29 is closed by a controller cover 30. The controller cover 30 is fixed to the cargo bed 2 by four screws 31. A vent 32 is provided in the controller cover 30. Air is supplied to the controller 14 through the vent 32. The controller 14 is cooled by the air supplied through the vent 32.

The battery 28 supplies power to the motors 7 via the controller 14. The battery mounting portion 27 and the controller 14 are connected to each other via a battery cable 33A which is a power supply cable. The controller 14 and the motors 7 are connected to one another via motor cables 33B which are power supply cables. The current output from the battery 28 is supplied to the motors 7 via the battery cables 33A, the controller 14, and the motor cable 33B.

A interior space is provided between the front plate 4A and the rear plate 4B of the back plate 4. The handle 3 has a pipe shape. A flexible tube 34 is disposed so as to connect the right column portion 3B and the cargo bed 2. A rubber tube is exemplified as the flexible tube 34. One end of the flexible tube 34 is connected to the right column portion 3B via a connection member 35. As illustrated in FIG. 6, the battery cable 33A is disposed in the interior space of the back plate 4, the interior space of the right column portion 3B, and the interior space of the flexible tube 34. The flexible tube 34 allows the handle 3 to change between the used state and the folded state.

Cable housing members 36 are disposed so as to connect the cargo bed 2 to the drive wheels 5. At least a part of each of the motor cable 33Bs is disposed in the interior space of the corresponding cable housing member 36. As illustrated in FIGS. 11 and 12, at least a part of each of the motor cables 33B is supported by the shaft 20.

The controller 14 and the headlight 9 are connected via a first light cable 33C which is a power supply cable. At least a part of the first light cable 33C is supported by the cargo bed 2. As illustrated in FIG. 8, a pipe-shaped cable holder 70 is provided on the cargo bed 2. The headlight 9 is disposed in a housing portion 73 (refer to FIG. 5) provided in the cargo bed 2. The housing portion 73 is provided so as to be recessed upward from the lower surface of the cargo bed 2. In a state where the headlight 9 is disposed in the housing portion 73, an opening provided in the lower portion of the housing portion 73 is closed by a headlight cover 71. The headlight cover 71 is fixed to the cargo bed 2 by two screws 72. The cable holder 70 is disposed so as to connect the housing portion 29 having the controller 14 housed therein to the housing portion 73 having the headlight 9 housed therein. The first light cable 33C is disposed inside the cable holder 70. The current output from the battery 28 is supplied to the headlight 9 via the battery cable 33A, the controller 14, and the first light cable 33C. The headlight 9 emits light by power supplied from the battery 28.

The controller 14 and the taillight 10 are connected via a second light cable 33D which is a power supply cable. At least a part of the second light cable 33D is supported by the cargo bed 2. As illustrated in FIG. 6, at least a part of the second light cable 33D is disposed in the interior space of the left column portion 3A and the interior space of the back plate 4. The current output from the battery 28 is supplied to the taillight 10 via the battery cable 33A, the controller 14, and the second light cable 33D. The taillight 10 emits light by power supplied from the battery 28.

The operating device 13 and the controller 14 are connected via a signal cable 33E. An operation signal generated by operating the operating device 13 is supplied to the controller 14 via the signal cable 33E. The signal cable 33E is disposed in the interior space of the grip portion 3C, the interior space of the right connection portion 3E, the interior space of the right column portion 3B, and the interior space of the flexible tube 34.

Battery Case

Figure 14:
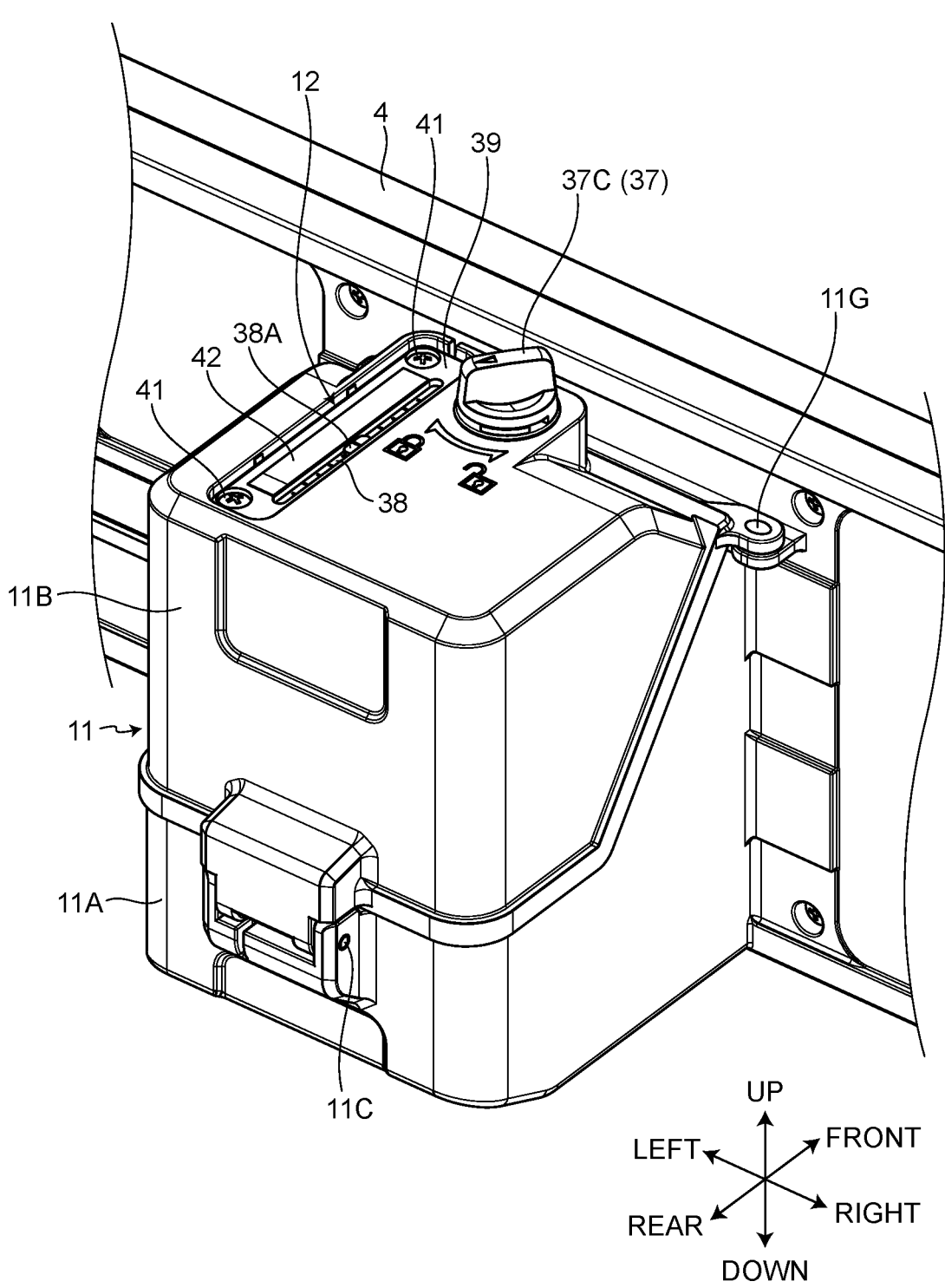
FIG. 14 is a rear perspective view illustrating a battery case according to the embodiment.
Figure 15:
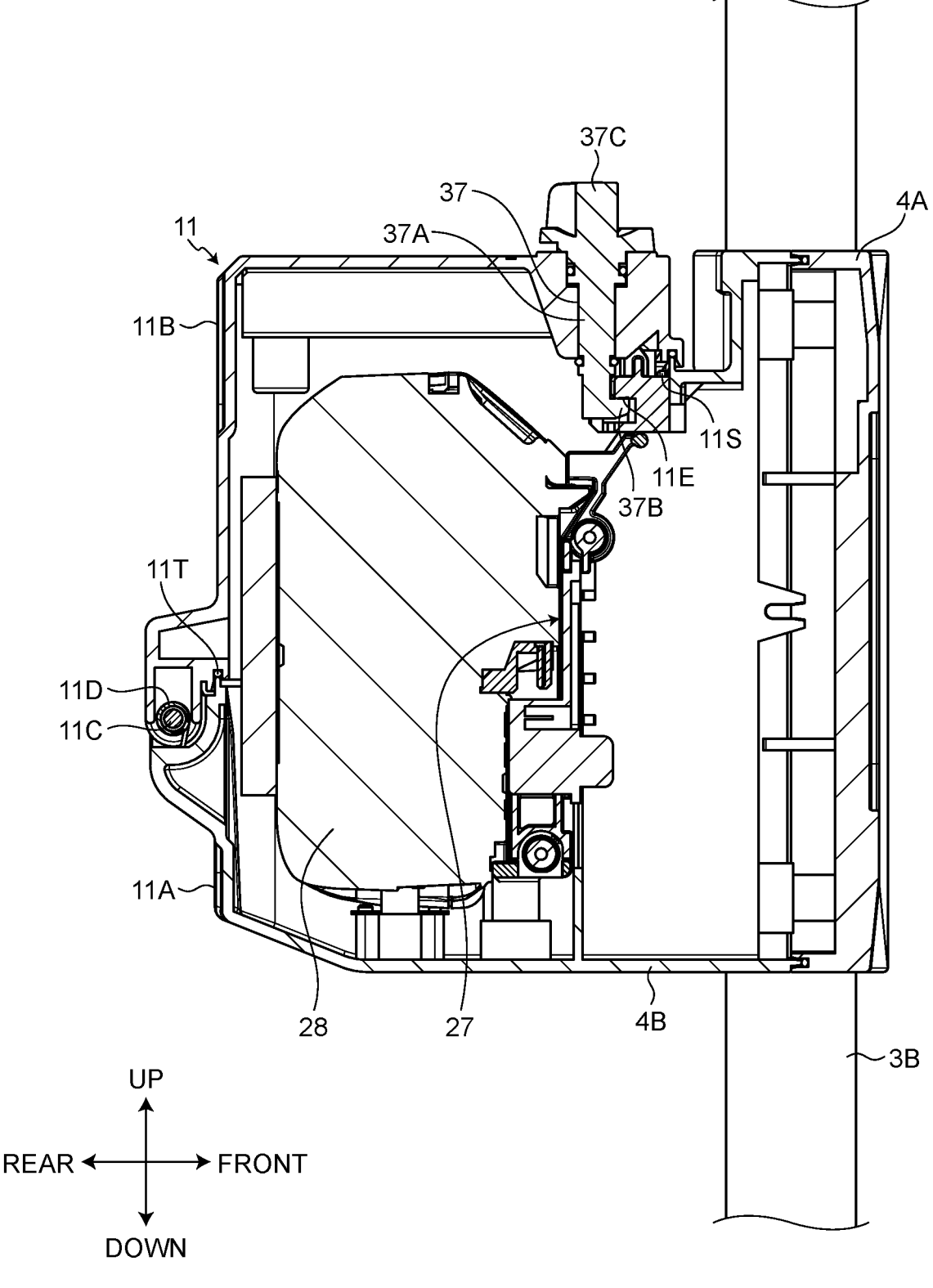
FIG. 15 is a cross-sectional view illustrating the battery case according to the embodiment.
Figure 16:
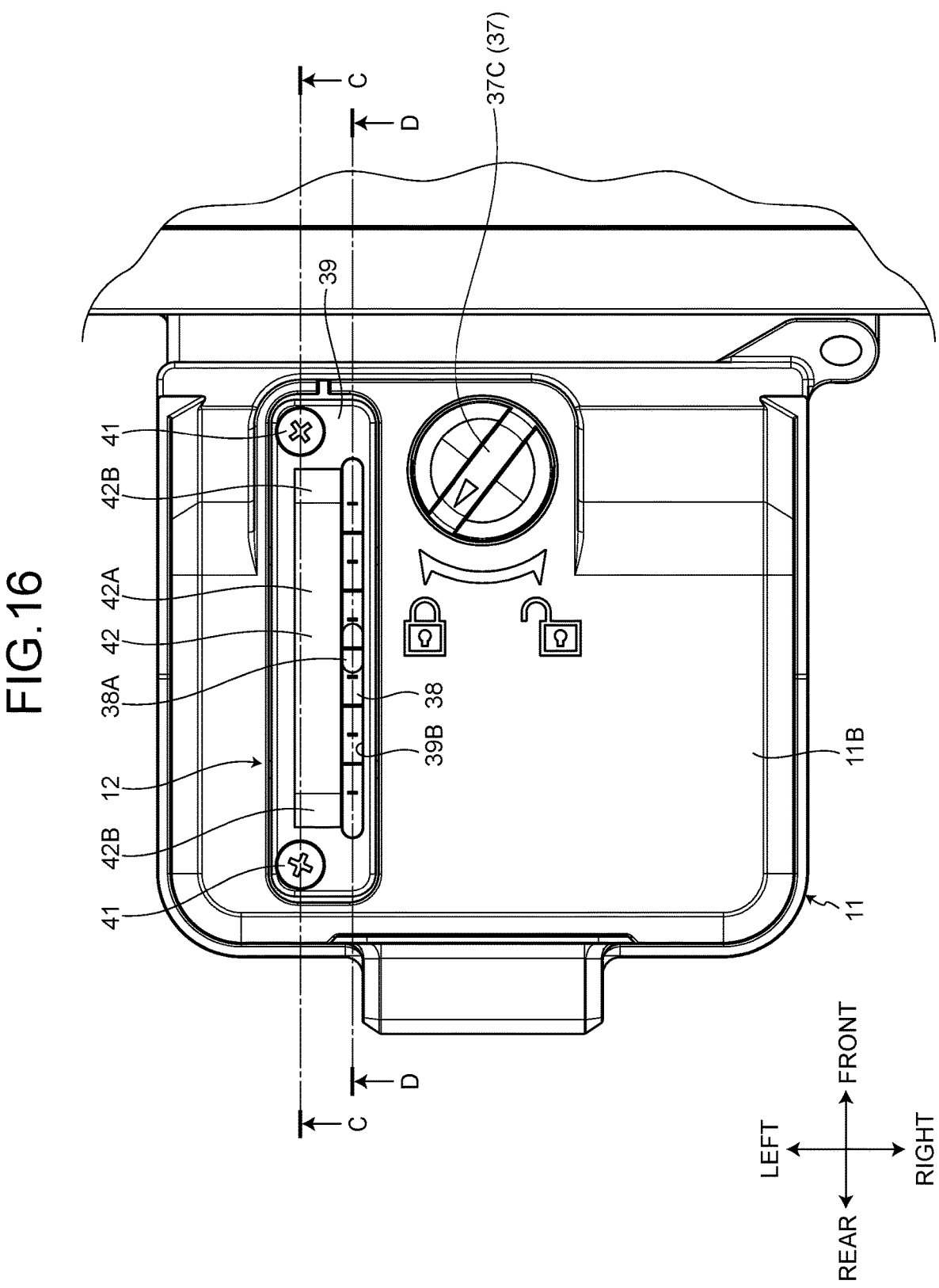
FIG. 16 is a view of the battery case according to the embodiment as viewed from above.
Figure 17:
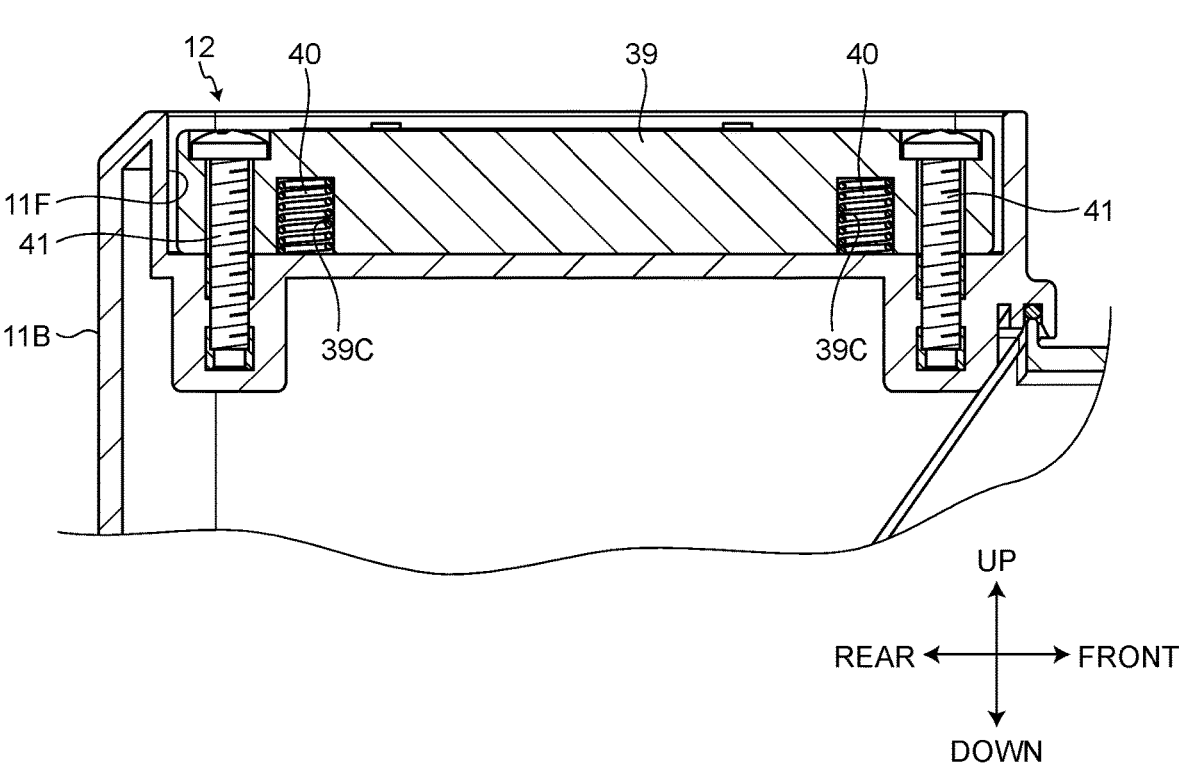
FIG. 17 is a cross-sectional view illustrating a part of the battery case according to the embodiment.
Figure 18:
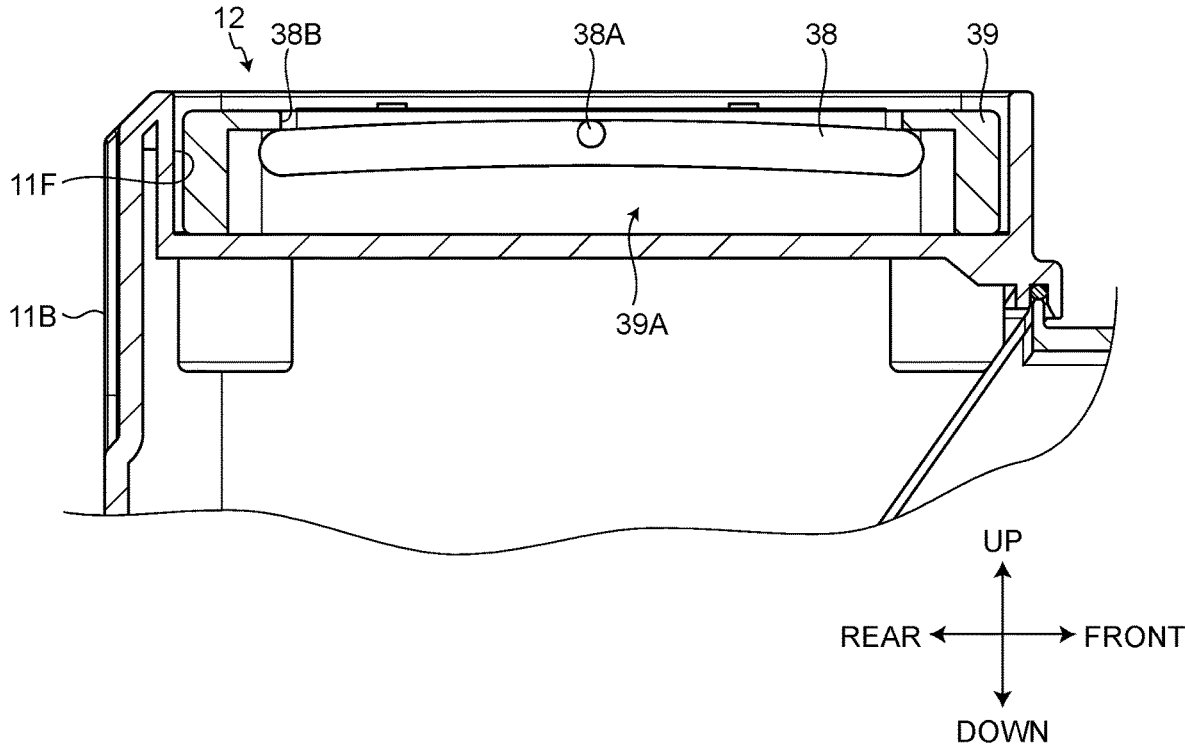
FIG. 18 is a cross-sectional view illustrating a part of the battery case according to the embodiment.
Figure 19:
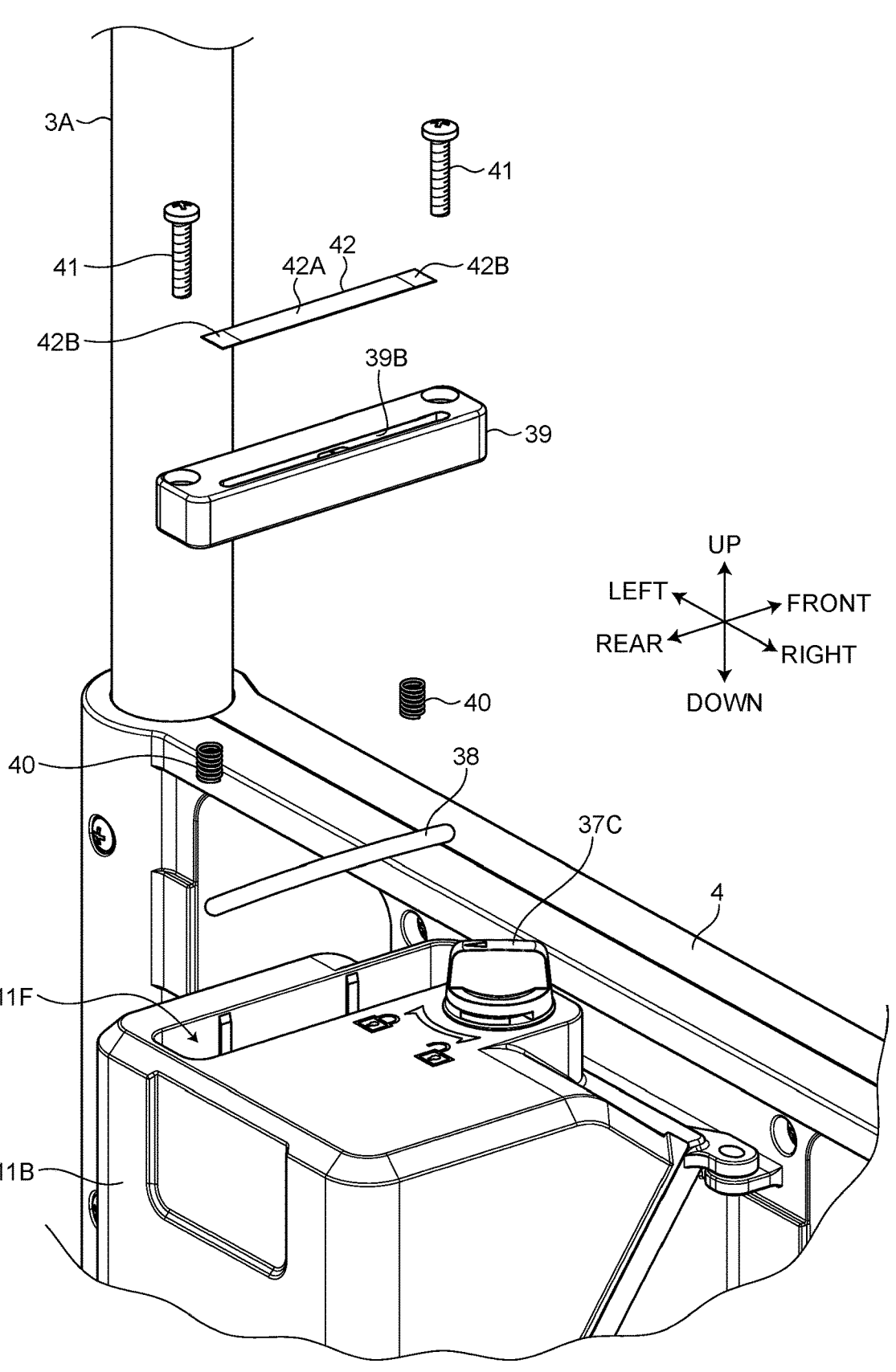
FIG. 19 is an exploded perspective view illustrating the battery case according to the embodiment.

FIG. 14 is a rear perspective view illustrating the battery case 11 according to the embodiment. FIG. 15 is a cross-sectional view illustrating the battery case 11 according to the embodiment. FIG. 16 is a view of the battery case 11 according to the embodiment as viewed from above. FIG. 17 is a cross-sectional view illustrating a part of the battery case 11 according to the embodiment and corresponds to a cross-sectional arrow view taken along line C-C in FIG. 16. FIG. 18 is a cross-sectional view illustrating a part of the battery case 11 according to the embodiment and corresponds to a cross-sectional arrow view taken along line D-D in FIG. 16. FIG. 19 is an exploded perspective view illustrating the battery case 11 according to the embodiment.

The battery case 11 includes the case body 11A and the case cover 11B configured to open and close the opening provided in the upper portion of the case body 11A. The rear portion of the case body 11A and the rear portion of the case cover 11B are connected via the hinge 11C. A torsion spring 11D is disposed on the hinge 11C. The torsion spring 11D generates an elastic force so that the case cover 11B is closed. The torsion spring 11D prevents rainwater and dust from entering the battery case 11 due to forgetting to close the case cover 11B. A seal member 11S is provided at a boundary between the front portion of the case cover 11B and the upper portion of the front portion of the case body 11A. A seal member 11T is provided at a boundary between the rear portion of the case cover 11B and the rear portion of the case body 11A.

The battery case 11 includes a locking member 37 configured to lock the case body 11A and the case cover 11B in a state where the case cover 11B is closed. The locking member 37 includes a shaft 37A, a hook 37B, and a dial 37C. The shaft 37A is rotatably supported by the case cover 11B. The hook 37B is provided at the lower end portion of the shaft 37A. The dial 37C is disposed at the front portion of the upper surface of the case cover 11B. When the dial 37C is rotated in one direction in a state where the opening of the case body 11A is closed by the case cover 11B, the hook 37B enters a recess 11E provided inside the case body 11A, and the case body 11A and the case cover 11B are locked. When the dial 37C is rotated in the other direction, the hook 37B is removed from the recess 11E, and the lock between the case body 11A and the case cover 11B is released.

In the embodiment, the battery case 11 has a padlock hole 11G. When a padlock is locked to the padlock hole 11G, the case cover 11B is not opened. This prevents theft of the battery 28.

Inclination Meter Unit

The inclination meter unit 12 is disposed on the upper surface of the case cover 11B. The inclination meter unit 12 includes the inclination meter 38, a meter case 39, coil springs 40, screws 41, and a label 42.

The inclination meter 38 is a so-called bubble tube (bubble level). In the following description, the inclination meter 38 is appropriately referred to as the bubble tube 38.

The bubble tube 38 encloses liquid and a bubble 38A having a predetermined size. Examples of the liquid include alcohol and ether. The bubble tube 38 is disposed so that the longitudinal direction of the bubble tube 38 coincides with the front-rear direction. That is, the bubble tube 38 is disposed so as to extend in the front-rear direction. The bubble tube 38 is long in the front-rear direction. In the embodiments, the bubble tube 38 is curved. The bubble tube 38 is curved so that the central portion of the bubble tube 38 is disposed above the both ends of the bubble tube 38 in the front-rear direction.

The meter case 39 houses the bubble tube 38. The meter case 39 has a housing space 39A in which the bubble tube 38 is housed, and an opening 39B in which the upper surface of the bubble tube 38 is disposed. The bubble tube 38 is fixed to the meter case 39 with, for example, an adhesive. The bubble tube 38 is supported by the case cover 11B via the meter case 39. The meter case 39 is disposed in a recess 11F provided on the upper surface of the case cover 11B.

The coil springs 40 and the screws 41 function as an angle adjustment mechanism configured to adjust an inclination angle of the meter case 39 in the front-rear direction with respect to the case cover 11B.

The coil springs 40 are disposed between the meter case 39 and the case cover 11B. Two coil springs 40 are disposed in the front-rear direction. The coil springs 40 are respectively disposed in recesses 39C provided on the lower surface of the meter case 39. The recesses 39C are formed so as to be recessed upward from the lower surface of the meter case 39. The upper end portion of each of the coil springs 40 is in contact with the meter case 39. The lower end portion of each of the coil springs 40 is in contact with the case cover 11B. The coil springs 40 are elastic members configured to bias the meter case 39 upward with respect to the case cover 11B. The lower surface of the meter case 39 may be in contact with the case cover 11B or may be away from the case cover 11B.

The screws 41 fix the meter case 39 and the case cover 11B. Two screws 41 are disposed so as to couple each of the front portion and the rear portion of the meter case 39 to the case cover. The inclination angle of the meter case 39 in the front-rear direction is adjusted by adjusting the fastening amount of each of the two screws 41. By adjusting the inclination angle of the meter case 39, the inclination angle of the bubble tube 38 in the front-rear direction is adjusted.

In a state where the power-assisted trolley 1 is disposed on the floor surface parallel to the horizontal plane, the fastening amount of the screw 41 is adjusted so that the bubble 38A is disposed at the central portion of the bubble tube 38 in the longitudinal direction. That is, the fastening amount of the screw 41 is adjusted so that the bubble 38A is disposed at the central portion of the bubble tube 38 in the longitudinal direction in a state where the ground contact surfaces of the two drive wheels 5 and the two universal wheels 6 are in contact with the floor surface parallel to the horizontal plane.

The label 42 displays thereon the inclination angle of the power-assisted trolley 1 with respect to the horizontal plane. The inclination angle of 0 degrees means that the power-assisted trolley 1 is disposed on the floor surface parallel to the horizontal plane. In the embodiment, a state in which the power-assisted trolley 1 is disposed on the floor surface parallel to the horizontal plane means a state in which the upper surface of the cargo bed 2 is parallel to the horizontal plane. The fact that the inclination angle is a positive value means that the power-assisted trolley 1 is inclined forward. The fact that the inclination angle is a negative value means that the power-assisted trolley 1 is inclined rearward. In the embodiment, an allowable value of the inclination angle of the power-assisted trolley 1 is determined in advance. As an example, the allowable value of the inclination angle of the power-assisted trolley 1 with respect to the horizontal plane is ±5 degrees. The inclination angle of +5 degrees means that the power-assisted trolley 1 is inclined forward by five degrees with respect to the horizontal plane. The inclination angle of −5 degrees means that the power-assisted trolley 1 is inclined rearward by five degrees with respect to the horizontal plane. The label 42 includes a first indicator portion 42A indicating that the inclination angle of the power-assisted trolley 1 is the allowable value and second indicator portions 42B indicating that the inclination angle thereof is not the allowable value. The second indicator portions 42B are disposed on the front side and the rear side of the first indicator portion 42A. The first indicator portion 42A is, for example, green. The second indicator portions 42B are, for example, yellow.

When the bubble tube 38 is linear, even if the power-assisted trolley 1 is slightly inclined (for example, even if the inclination angle is one degree), the bubble 38A moves to the end portion of the bubble tube 38, and the user cannot visually recognize the bubble 38A. That is, when the bubble tube 38 is linear, the inclination meter 38 has too significant sensitivity, and it is difficult to display the inclination angle up to five degrees. In the embodiment, the bubble tube 38 has a curved shape bulging upward. Therefore, when the power-assisted trolley 1 is slightly inclined (for example, when the inclination angle is one degree), the bubble 38A does not move to the end portion of the bubble tube 38. The bubble 38A remains in the range of the first indicator portion 42A. Therefore, the user can visually recognize the bubble 38A. Since the bubble tube 38 has a curved shape bulging upward, the allowable value of ±5 degrees can be displayed.

Operating Device

Figure 20:
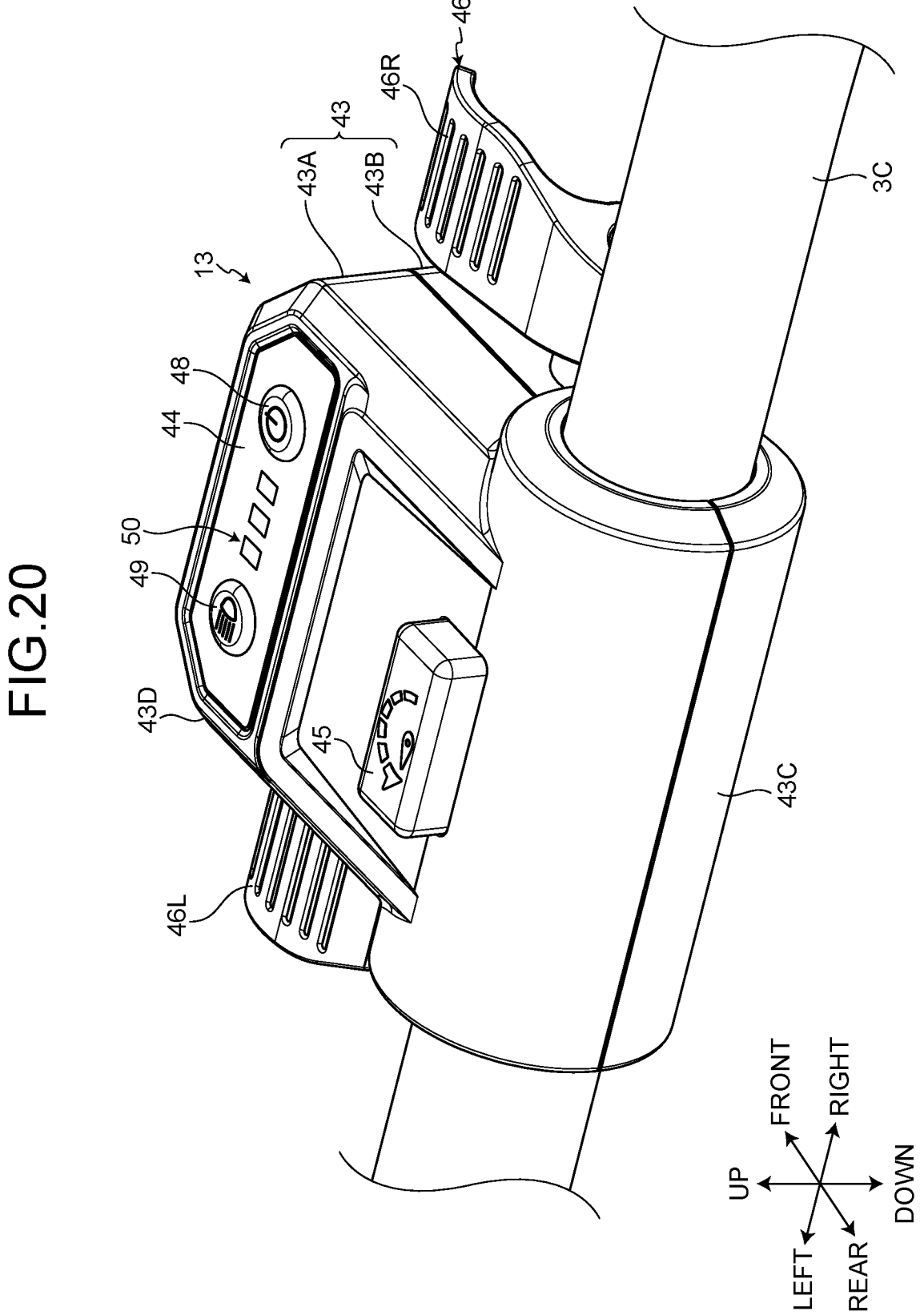
FIG. 20 is a rear perspective view illustrating an operating device according to the embodiment.
Figure 21:
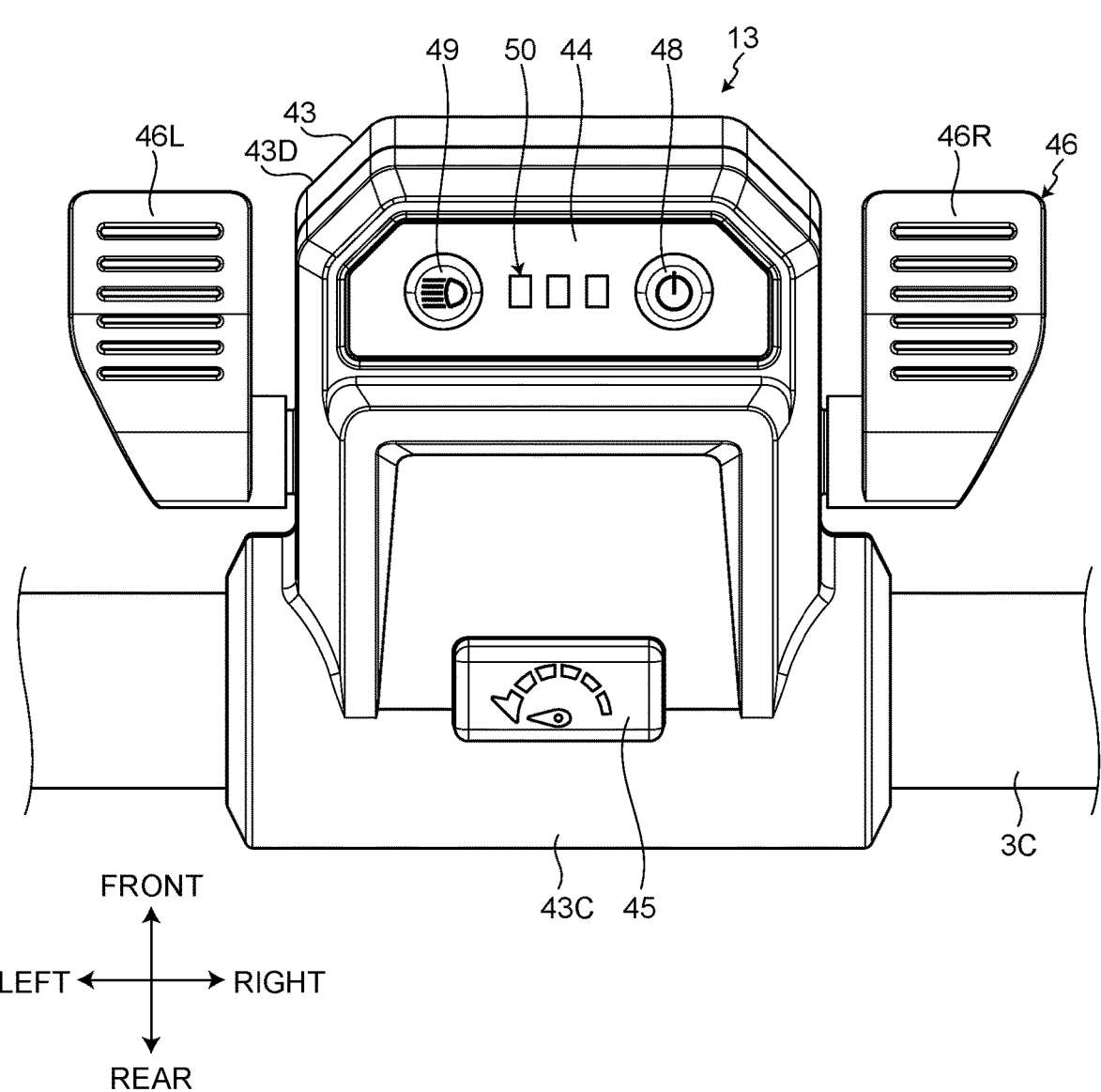
FIG. 21 is a view of the operating device according to the embodiment as viewed from above.
Figure 22:
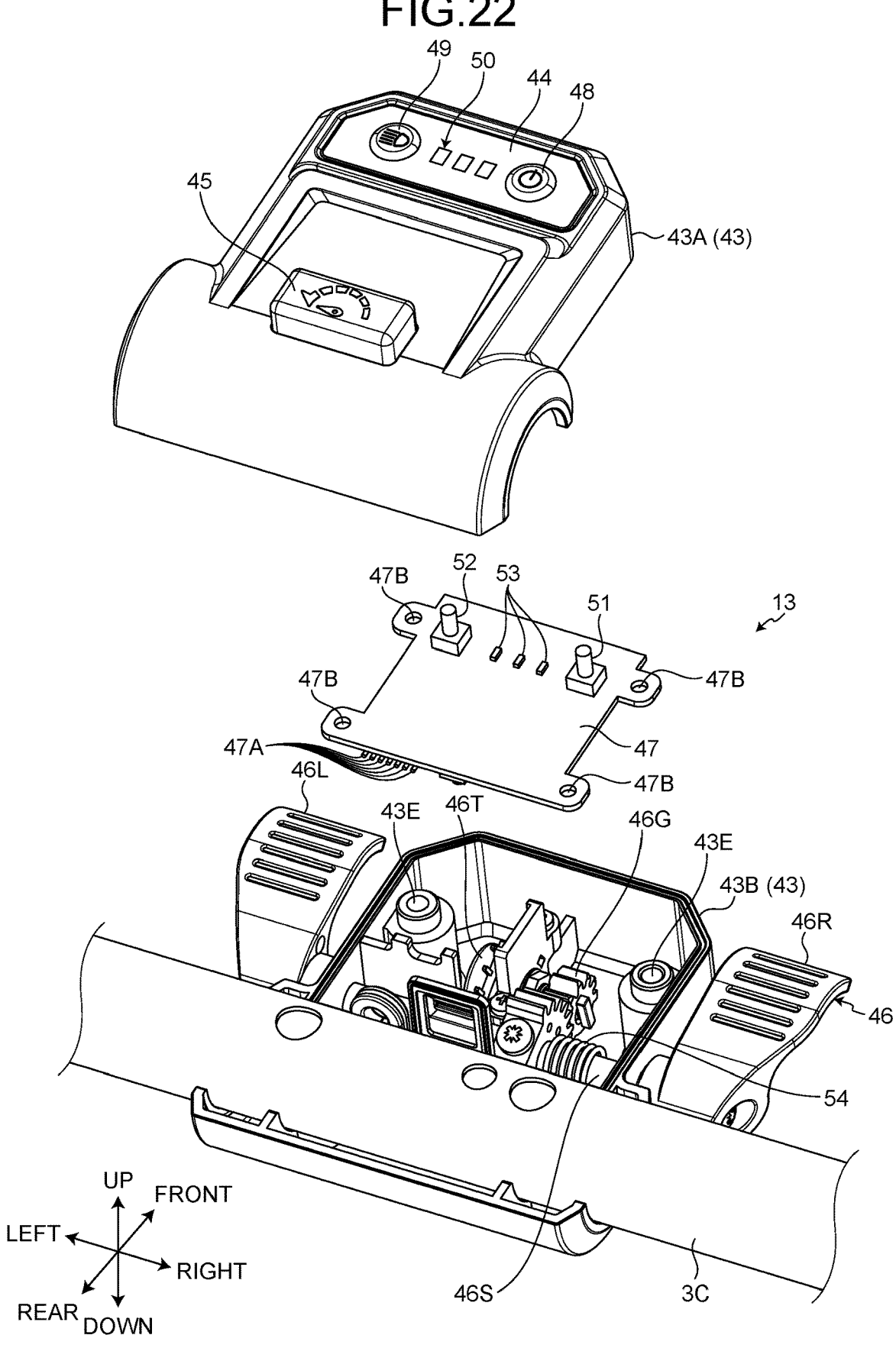
FIG. 22 is an exploded perspective view illustrating the operating device according to the embodiment.
Figure 23:
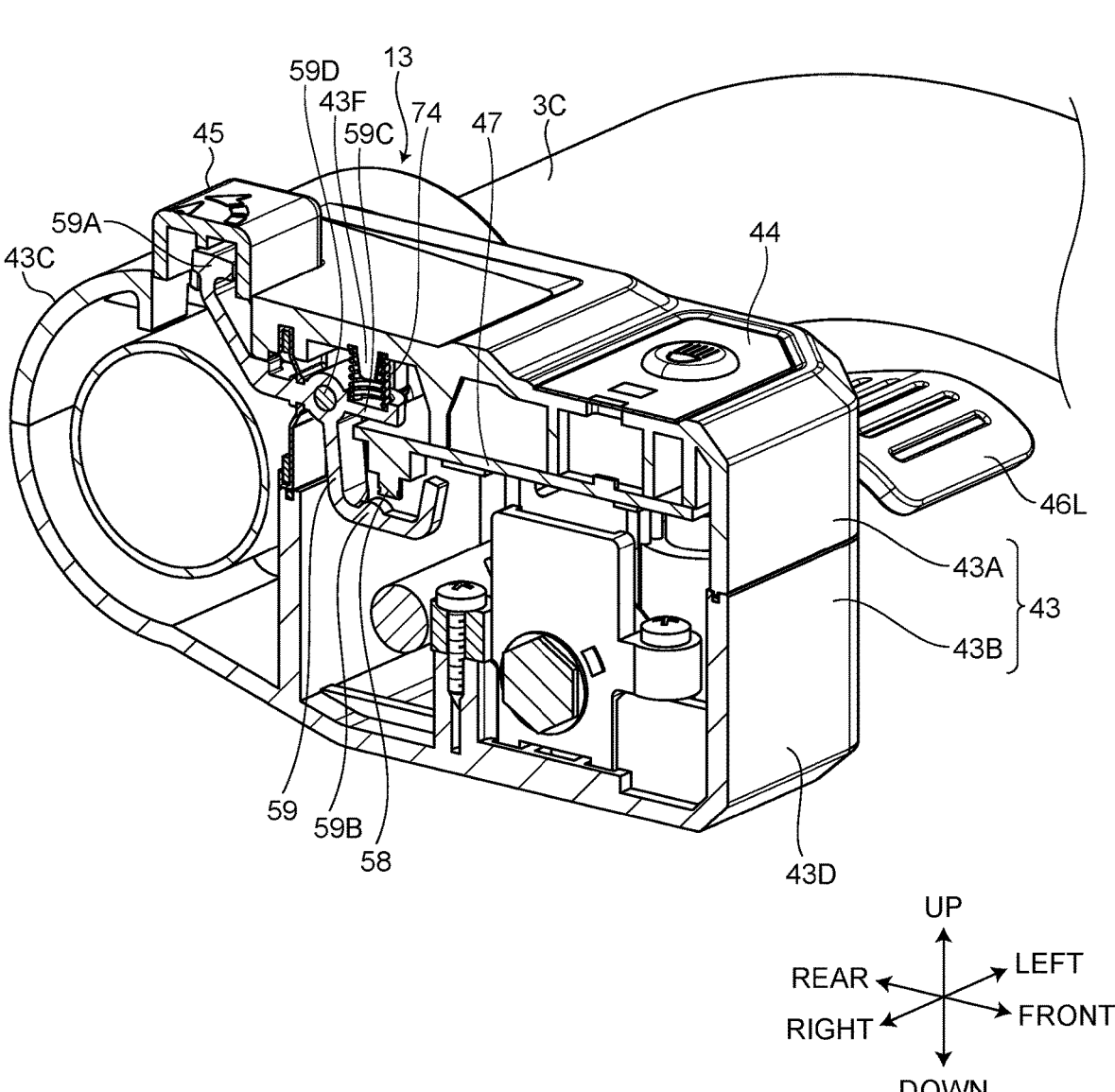
FIG. 23 is a perspective cross-sectional view illustrating the operating device according to the embodiment.

FIG. 20 is a rear perspective view illustrating the operating device 13 according to the embodiment. FIG. 21 is a view of the operating device 13 according to the embodiment as viewed from above. FIG. 22 is an exploded perspective view illustrating the operating device 13 according to the embodiment. FIG. 23 is a perspective cross-sectional view illustrating the operating device 13 according to the embodiment.

The operating device 13 is mounted on the grip portion 3C. The operating device 13 includes a case 43, a panel 44, a brake button 45, a shift lever 46, and a circuit board 47.

The case 43 houses at least the circuit board 47. The case 43 includes an upper case 43A and a lower case 43B. A part of the upper case 43A and a part of the lower case 43B are disposed so as to sandwich the grip portion 3C in the up-down direction.

The case 43 includes a connection portion 43C disposed around the grip portion 3C, and a box portion 43D disposed forward of the connection portion 43C. The connection portion 43C has a cylindrical shape. The connection portion 43C is fixed to the grip portion 3C. The box portion 43D is disposed forward of the grip portion 3C. The box portion 43D houses at least the circuit board 47.

The panel 44 is disposed at the front portion of the upper surface of the box portion 43D. The panel 44 includes a power button 48, a light button 49, and a display unit 50. The power button 48 is disposed on the right side of the light button 49. The display unit 50 is disposed between the power button 48 and the light button 49.

The brake button 45 is disposed on a rear portion of the upper surface of the box portion 43D.

The shift lever 46 is rotatably supported by the box portion 43D.

The circuit board 47 includes a first switch 51 disposed directly below the power button 48, a second switch 52 disposed directly below the light button 49, and LED chips 53 disposed directly below the display unit 50. When the power button 48 is pressed, the first switch 51 is operated. When the light button 49 is pressed, the second switch 52 is operated. The display unit 50 includes three transmission parts. When any of the LED chip 53 is turned on (emit light), light emitted from the LED chip 53 is output above the box portion 43D via the display unit 50. Four screw openings 47B are provided in a peripheral portion of the circuit board 47. Four screw bosses 43E are provided in the lower case 43B. Screws (not illustrated) inserted into the screw openings 47B are coupled to screw holes provided in the screw bosses 43E. The circuit board 47 is fixed to the lower case 43B with four screws (not illustrated).

When at least one of the power button 48, the light button 49, the brake button 45, and the shift lever 46 is operated, operation signals are output from output terminals 47A of the circuit board 47. The output terminals 47A are connected to the above-described signal cable 33E. The operation signals output from the circuit board 47 is transmitted to the controller 14 via the signal cable 33E.

When the power button 48 is pressed in a state where the controller 14 and the motor 7 are stopped, the controller 14 and the motor 7 are activated. When the power button 48 is pressed in a state where the controller 14 and the motor 7 are activated, the controller 14 and the motor 7 are stopped.

When the light button 49 is pressed in a state where the headlight 9 and the taillight 10 are turned off, the headlight 9 and the taillight 10 are turned on. When the light button 49 is pressed in a state where the headlight 9 and the taillight 10 are turned on, the headlight 9 and the taillight 10 are turned off.

The display unit 50 displays thereon the remaining capacity amount of the battery. The display unit 50 includes three transmission units. The LED chips 53 are respectively disposed directly below the three transmission units. As the remaining capacity amount of the battery 28 increases, the number of LED chips 53 to be turned on increases, and as the remaining capacity amount of the battery 28 decreases, the number of LED chips 53 to be turned on decreases.

The shift lever 46 is operated to adjust the rotational speed of the motor 7. The shift lever 46 is supported by the case 43. The shift lever 46 includes a left operation portion 46L protruding leftward from the left surface of the box portion 43D and a right operation portion 46R protruding rightward from the right surface of the box portion 43D. The left operation portion 46L and the right operation portion 46R are connected to each other inside the box portion 43D. The shift lever 46 includes a shaft 46S that connects the left operation portion 46L to the right operation portion 46R. The shaft 46S is rotatably supported by the box portion 43D. The left operation portion 46L is disposed so as to protrude forward from the left portion of the shaft 46S. The right operation portion 46R is disposed so as to protrude forward from the right portion of the shaft 46S.

When at least one of the front end portion of the left operation portion 46L and the front end portion of the right operation portion 46R is pushed downward from an initial position, the shaft 46S rotates. As the amount of downward movement of the front end portion of the left operation portion 46L and the front end portion of the right operation portion 46R increases, the amount of rotation of the shaft 46S increases. In the box portion 43D, a variable resistor 46T whose resistance value changes according to the rotation amount of the shaft 46S is disposed. The circuit board 47 detects the rotation amount of the shaft 46S based on the resistance value of the variable resistor 46T. In the embodiment, a gear 46G is disposed between the shaft 46S and the variable resistor 46T. The rotation of the shaft 46S is transmitted to the variable resistor 46T via the gear 46G. The gear 46G decelerates the rotation of the shaft 46S. The circuit board 47 outputs operation signals for adjusting the rotational speed of the motor 7 based on the rotation amount of the shaft 46S transmitted via the gear 46G. The circuit board 47 outputs the operation signals so as to increase the rotational speed of the motor 7 as the rotation amount of the shaft 46S from the initial position of the shift lever 46 increases. That is, as the amount of the downward movement of each of the front end portion of the left operation portion 46L and the front end portion of the right operation portion 46R increases, the circuit board 47 outputs the operation signals so that the power-assisted trolley 1 moves at a higher speed. The rotational speed of the motor 7, that is, the moving speed of the power-assisted trolley 1 changes based on the operation amount of the shift lever 46. As the amount of the downward movement of each of the front end portion of the left operation portion 46L and the front end portion of the right operation portion 46R decreases, the rotational speed of the motor 7 decreases, whereas as the amount of the downward movement of each of the front end portion of the left operation portion 46L and the front end portion of the right operation portion 46R increases, the rotational speed of the motor 7 increases.

In the embodiment, the left operation portion 46L, the right operation portion 46R, and the shaft 46S are formed to be integrated (single member). The left operation portion 46L and the right operation portion 46R rotate together. When the left operation portion 46L is pushed, the right operation portion 46R rotates together with the left operation portion 46L. When the right operation portion 46R is pushed, the left operation portion 46L rotates together with the right operation portion 46R.

In the embodiment, a torsion spring 54 is mounted on the shaft 46S. The torsion spring 54 generates an elastic force so that the front end portion of the left operation portion 46L and the front end portion of the right operation portion 46R move upward. When the operation of the shift lever 46 is released, the shift lever 46 returns to the initial position by the elastic force of the torsion spring 54.

The brake button 45 is operated to lower the traveling speed of the power-assisted trolley 1. When the brake button 45 is pressed, the motor 7 is operated so as to apply a resistance force to the rotation of the drive wheel That is, the brake button 45 is operated to apply a resistance force to the rotation of the drive wheel 5, and when the brake button 45 is pressed, the motor 7 functions as an electric brake. The electric brake by the motor 7 is operated only while the brake button 45 is pressed. For example, when the power-assisted trolley 1 travels on a downhill in a state where a heavy cargo is loaded on the cargo bed 2, the brake button 45 is pressed to apply the electric brake only in a period during which the brake button 45 is pressed, so that the user can go down the downhill while pulling the power-assisted trolley 1 with a light force.

As illustrated in FIG. 23, a third switch 58 is disposed on the lower surface of the circuit board 47. A cam member 59 and a coil spring 74 are disposed inside the case 43. The coil spring 74 is disposed around a protrusion 43F protruding downward from the ceiling surface of the upper case 43A. The cam member 59 includes a first abutting portion 59A disposed directly below the brake button 45, a second abutting portion 59B disposed directly below the third switch 58, a third abutting portion 59C disposed directly below the coil spring 74, and a rotary shaft 59D rotatably supported by at least a part of the case 43. The first abutting portion 59A is disposed rearward of the rotary shaft 59D. Each of the second abutting portion 59B and the third abutting portion 59C is disposed in front of the rotary shaft 59D. The lower end portion of the coil spring 74 is in contact with the upper surface of the third abutting portion 59C. The coil spring 74 generates an elastic force so that the third abutting portion 59C moves downward. When the brake button 45 is pressed, the first abutting portion 59A moves downward. When the first abutting portion 59A moves downward, the rotary shaft 59D rotates, and each of the second abutting portion 59B and the third abutting portion 59C moves upward. As the second abutting portion 59B moves upward, the third switch 58 is pushed upward by the second abutting portion 59B, and the third switch 58 is operated. When the third switch 58 is operated, operation signals are output from the output terminal 47A of the circuit board 47 so that the motor 7 functions as an electric brake. When the operation of the brake button 45 is released, the third abutting portion 59C moves downward by the elastic force of the coil spring 74. When the third abutting portion 59C moves downward, the rotary shaft 59D rotates, the second abutting portion 59B moves downward, and the first abutting portion 59A moves upward. When the second abutting portion 59B moves downward, the operation of the third switch 58 is released, and the output of the operation signals for causing the motor 7 to function as the electric brake is stopped. When the first abutting portion 59A moves upward, the brake button 45 is returned to the initial position.

Specifications

As described above, the drive wheels 5 rotated by the motor 7 are rear wheels. The universal wheels 6 are a front wheels. That is, the power-assisted trolley 1 is a rear wheel drive forward steering system. The power-assisted trolley 1 has the operability similar to the hand-pushed trolley.

The power-assisted trolley 1 can perform assisted traveling by generating the rotational force of the motor 7 and non-assisted traveling without generating the rotational force of the motor 7. That is, the user also can use the power-assisted trolley 1 as a hand-pushed trolley. The motor 7 assists the user when the power-assisted trolley 1 moves forward, but does not assist the user when the power-assisted trolley 1 moves rearward.

In the embodiment, the rated voltage of the battery 28 is 18 [V].

The distance for which the motor 7 can perform the assisted traveling is 10 [km].

The maximum loading amount of the power-assisted trolley 1 in the assisted traveling is 60 [kg]. The maximum loading amount of the power-assisted trolley 1 in the non-assisted traveling in which the motor 7 is not driven is 150 [kg].

The maximum climbing ability of the power-assisted trolley 1 is 5[° ].

The controller 14 is capable of adjusting the traveling speed of the power-assisted trolley 1 in the range of 0 [km/h] or more and 5 [km/h] or less.

The dimension of the cargo bed 2 in the front-rear direction is 750 [mm], and the dimension of the cargo bed 2 in the left-right direction is 480 [mm]. The dimension of the power-assisted trolley 1 in the front-rear direction in the used state is 842 [mm], the dimension of the power-assisted trolley 1 in the left-right direction in the used state is 480 [mm], and the dimension of the power-assisted trolley 1 in the up-down direction in the used state is 925 [mm].

In a state where the battery 28 is mounted, the mass of the power-assisted trolley 1 is 16.4 [kg].

All the numerical values of the above-described specifications can be changed within a range of ±10%. All the numerical values of the above-described specifications can be changed within a range of ±20%. The numerical values of the above-described specifications can be changed to any values.

Folded State

Figure 24:
FIG. 24 is a perspective view illustrating a connection mechanism according to the embodiment.

FIG. 24 is a perspective view illustrating the connection mechanism 18 according to the embodiment. FIG. 24 illustrates the connection mechanism 18 configured to connect the left column portion 3A to the cargo bed 2. The connection mechanism 18 supports the lower end portion of the left column portion 3A such that the left column portion 3A is allowed to rotate with respect to the cargo bed 2. As described above, the handle 3 rotates so as to change between the used state and the folded state. The used state is a state in which each of the left column portion 3A and the right column portion 3B is disposed so as to extend upward from the cargo bed 2. The folded state is a state in which the grip portion 3C is rotated so as to approach the upper surface of the cargo bed 2. The connection mechanism 18 includes a left plate portion 18A disposed on the left side of the left column portion 3A, a right plate portion 18B disposed on the right side of the left column portion 3A, a lower plate portion 18C connecting the lower end portion of the left plate portion 18A and the lower end portion of the right plate portion 18B, and a rotary shaft 18D supported by the left plate portion 18A and the right plate portion 18B. The lower plate portion 18C is fixed to the cargo bed 2. The pair of connection mechanisms 18 locks the handle 3 in the used state of the handle 3, thereby making it possible to prevent rotation of the handle 3. The pair of connection mechanisms 18 has the folding bar 19. When the folding bar 19 is moved downward by the user, the lock of the handle 3 is released, and the handle 3 can be rotated so as to change from the used state to the folded state.

A protrusion 18E is provided on the right surface of the left plate portion 18A. The protrusion 18E protrudes rightward from the right surface of the left plate portion 18A. When the handle 3 is rotated so as to change from the used state to the folded state, the lower end portion of the left column portion 3A comes into contact with the protrusion 18E. When the handle 3 rotates so as to change from the used state to the folded state, the lower end portion of the left column portion 3A receives resistance from the protrusion 18E, so that the handle 3 is suppressed from falling vigorously. The protrusion 18E also prevents the handle 3 in the folded state from unnecessarily rising.

Figure 25:
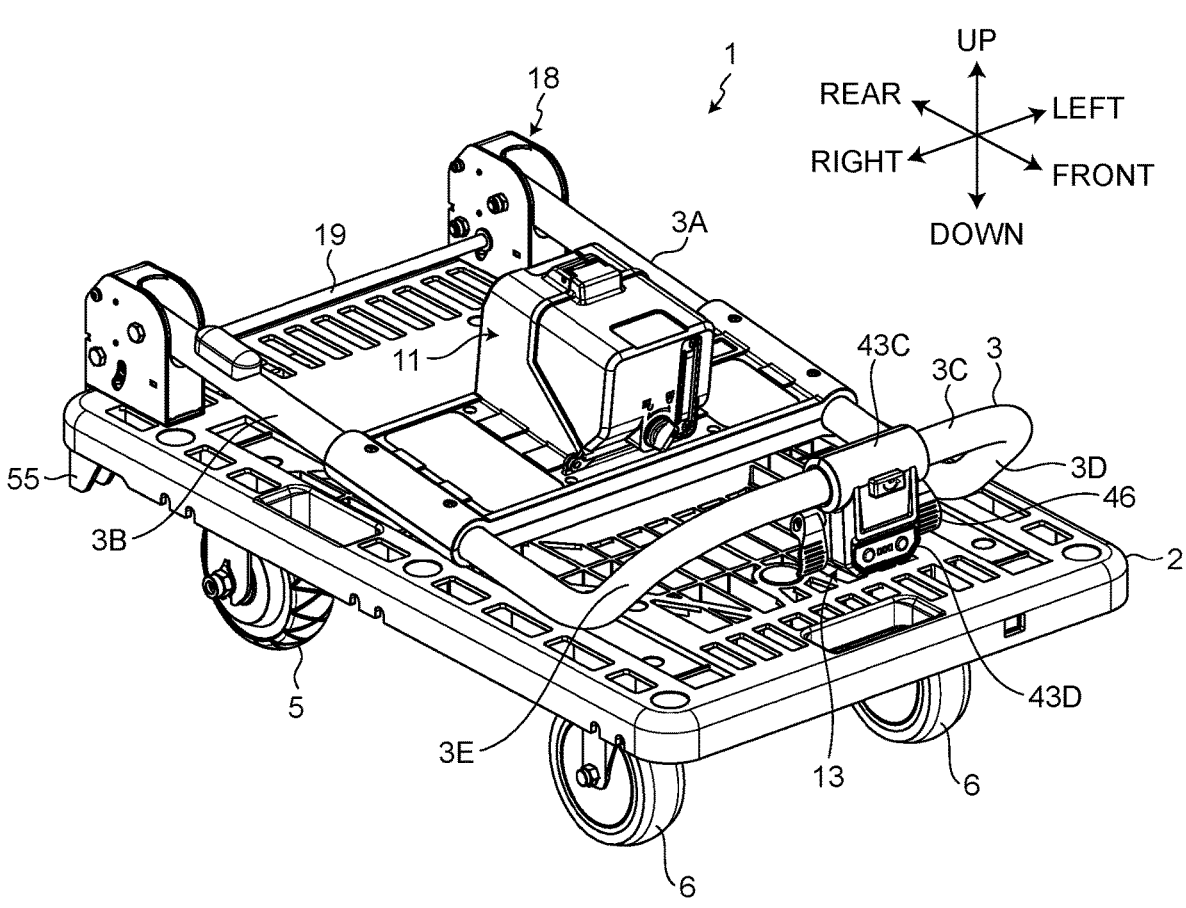
FIG. 25 is a front perspective view illustrating the power-assisted trolley in a folded state according to the embodiment.
Figure 26:
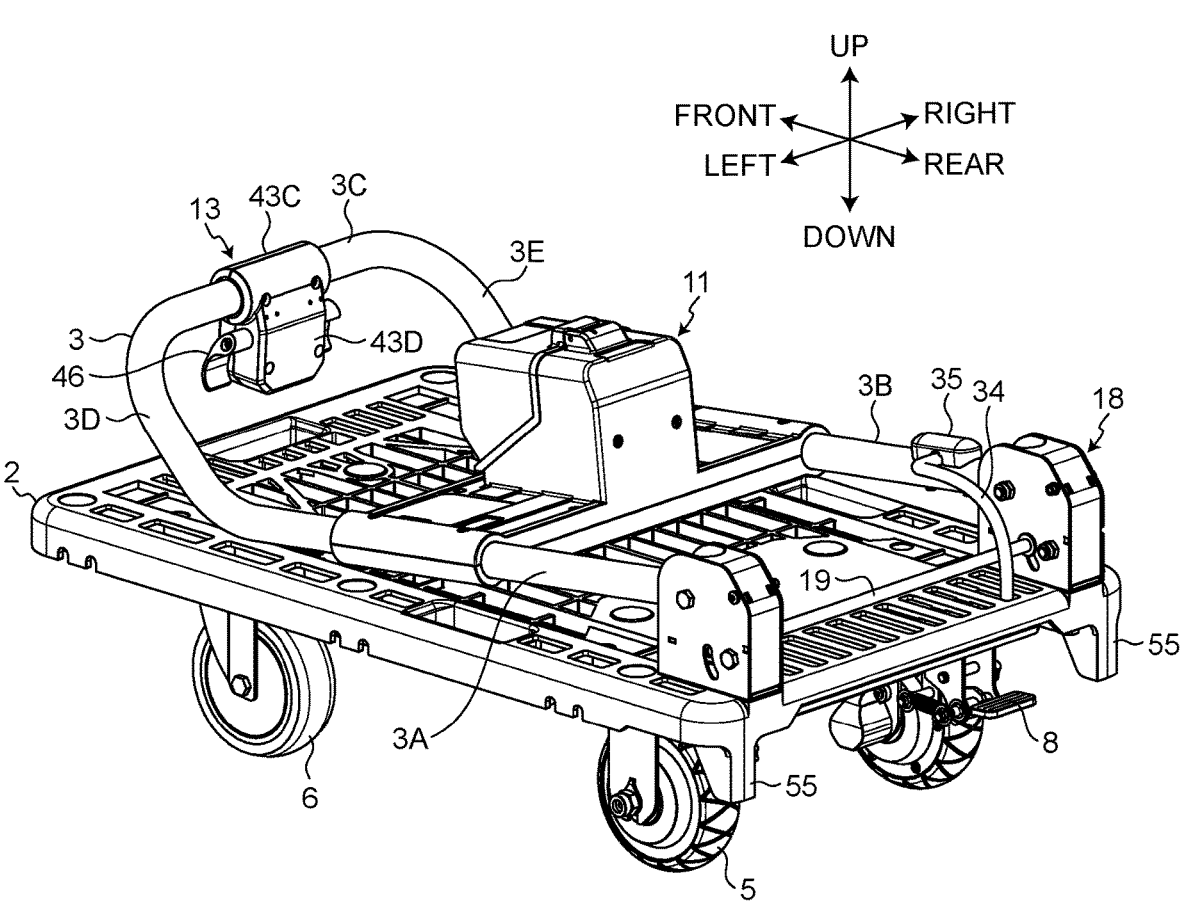
FIG. 26 is a rear perspective view illustrating the power-assisted trolley in the folded state according to the embodiment.
Figure 27:
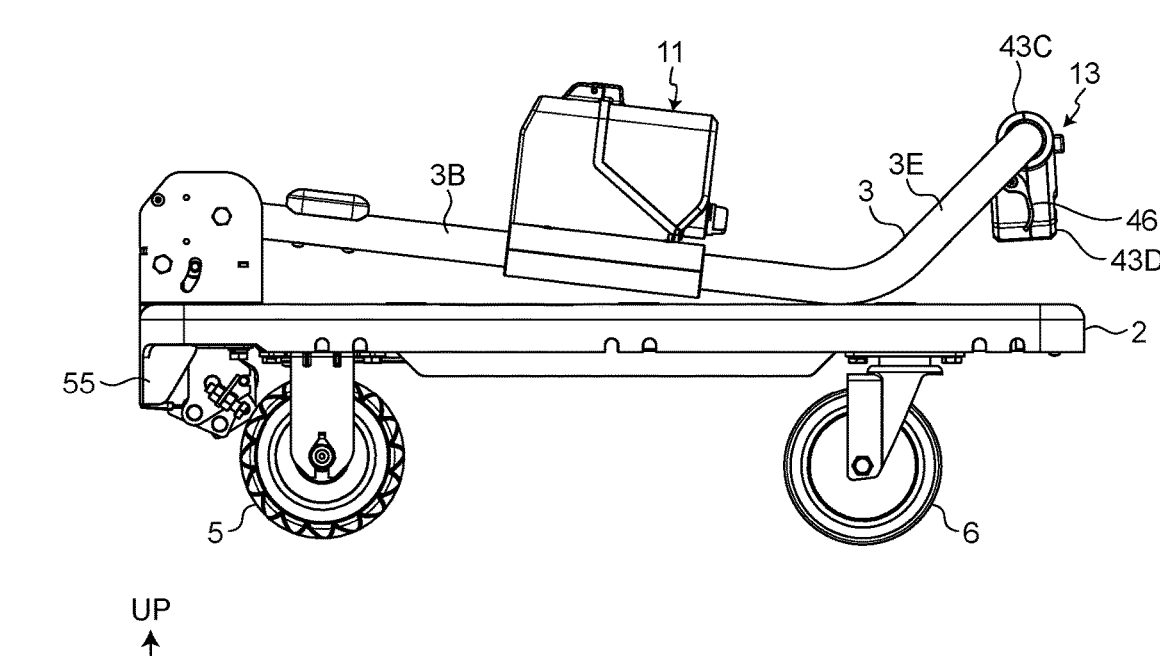
FIG. 27 is a view of the power-assisted trolley in the folded state according to the embodiment as viewed from the right side.
Figure 27:
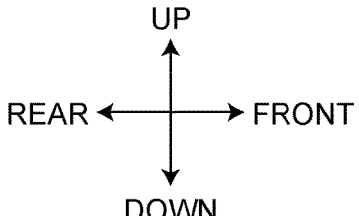

FIG. 25 is a front perspective view illustrating the power-assisted trolley 1 in the folded state according to the embodiment. FIG. 26 is a rear perspective view illustrating the power-assisted trolley 1 in the folded state according to the embodiment. FIG. 27 is a view of the power-assisted trolley 1 in the folded state according to the embodiment as viewed from the right side.

In the used state, the box portion 43D and the shift lever 46 are disposed forward of the grip portion 3C. Therefore, in the folded state, the box portion 43D and the shift lever 46 are disposed below the grip portion 3C. In the folded state, since the box portion 43D and the shift lever 46 are not disposed above the grip portion 3C, it is possible to suppress contact between an object around the power-assisted trolley 1 and the box portion 43D and the shift lever 46. In the used state, the grip portion 3C is disposed rearward of the left column portion 3A and the right column portion 3B. Therefore, even when the left column portion 3A and the right column portion 3B come into contact with the cargo bed 2 in the folded state, it is possible to suppress contact between the cargo bed 2 and each of the box portion 43D and the shift lever 46.

Figure 28:
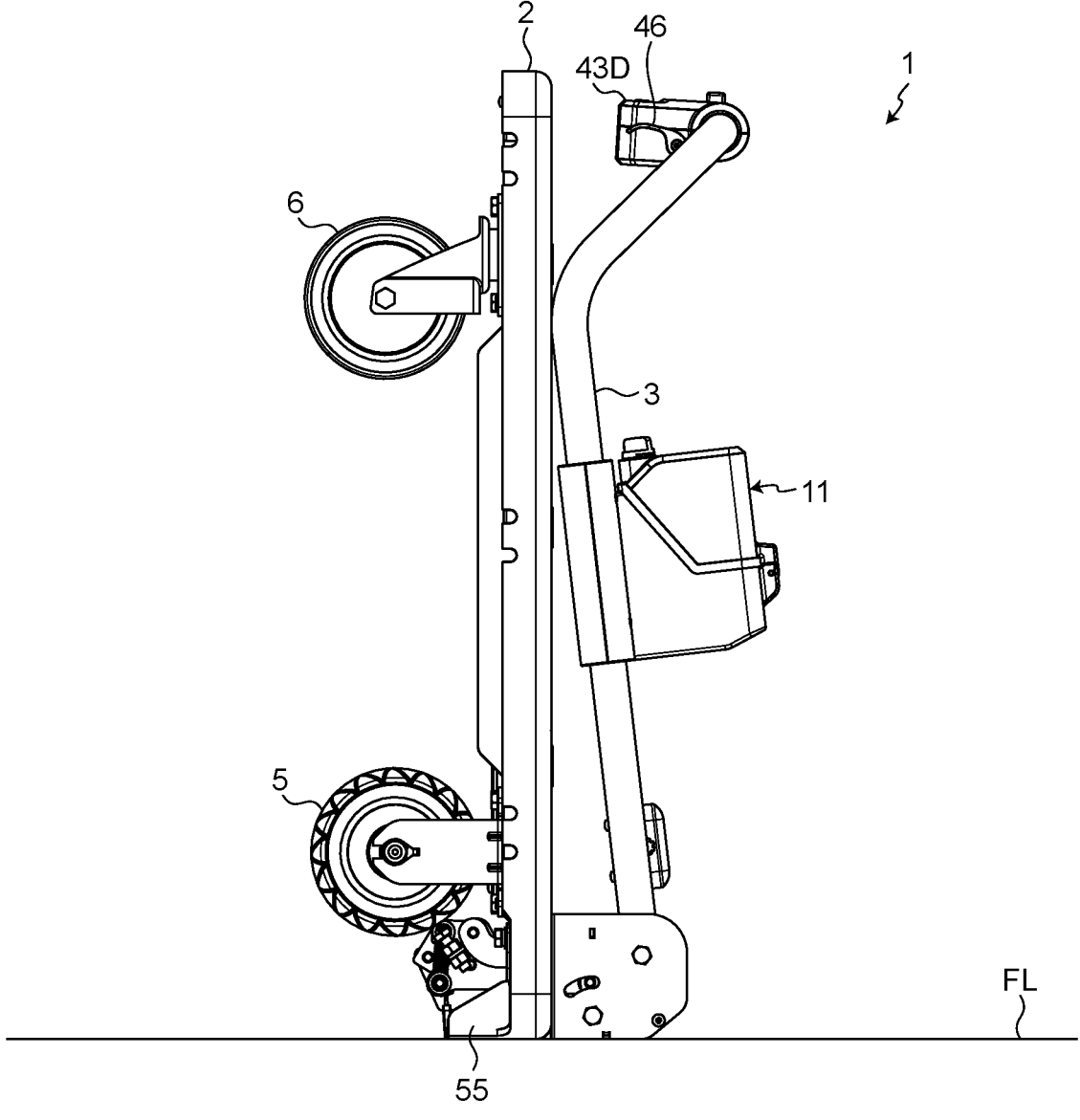
FIG. 28 is a view illustrating a state in which the power-assisted trolley in the folded state according to the embodiment stands on a floor surface.

FIG. 28 is a diagram illustrating a state in which the power-assisted trolley 1 in the folded state according to the embodiment stands on a floor surface FL. In the embodiment, leg portions 55 are provided in the cargo bed 2. As illustrated in FIGS. 1 and 2, in the used state, each of the leg portions 55 protrudes downward from the rear portion of the lower surface of the cargo bed 2. In the used state, each of the leg portions 55 is disposed rearward of the drive wheel 5. As illustrated in FIG. 28, the user can stand the power-assisted trolley 1 on the floor surface FL so that the leg portions 55 are in contact with the floor surface FL. As a result, the power-assisted trolley 1 is stored in a state of suppressing an increase in the occupied area of the power-assisted trolley 1. As described above, the motors 7 are respectively disposed inside the drive wheels 5. Therefore, the weights of the drive wheels 5 are large. In a case where the leg portions 55 are not provided, when the power-assisted trolley 1 stands on the floor surface FL, there is a possibility that the power-assisted trolley 1 falls down due to the weights of the drive wheels 5. In the embodiment, since the leg portions 55 are provided, the power-assisted trolley 1 is suppressed from falling.

Table

Figure 29:
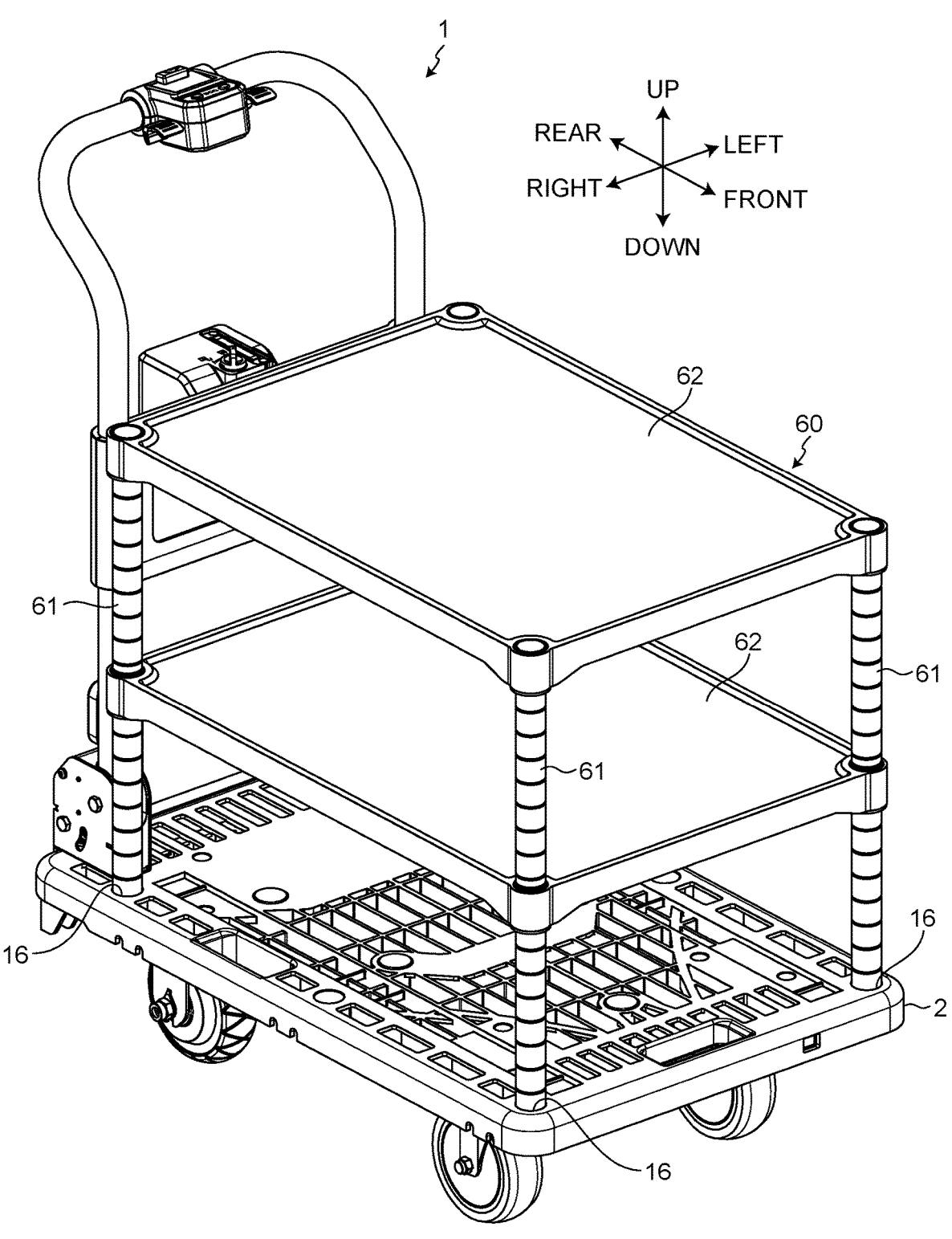
FIG. 29 is a front perspective view illustrating the power-assisted trolley mounted with a table according to the embodiment.
Figure 30:
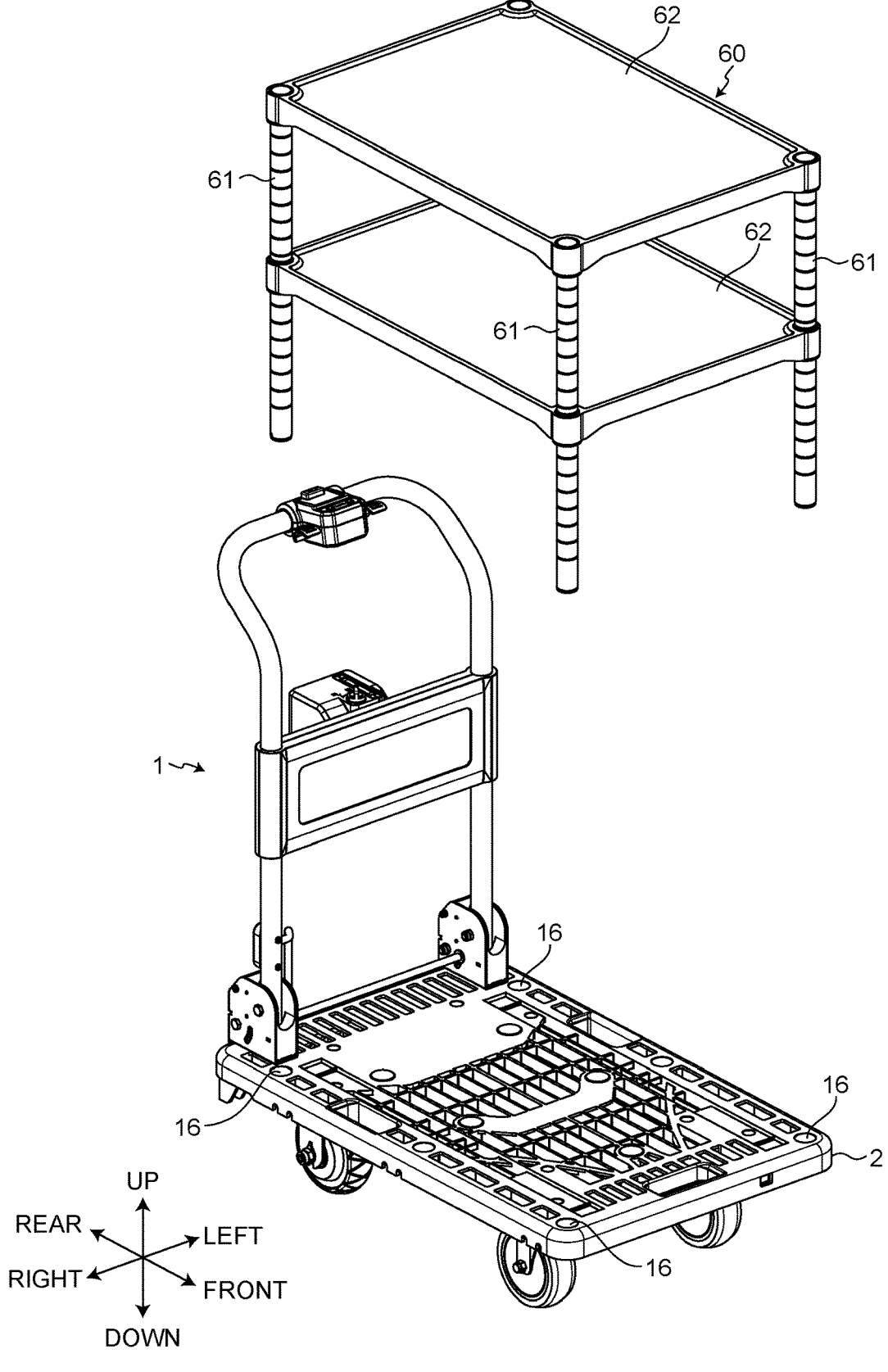
FIG. 30 is a front perspective view illustrating the table and the power-assisted trolley according to the embodiment.
Figure 31:
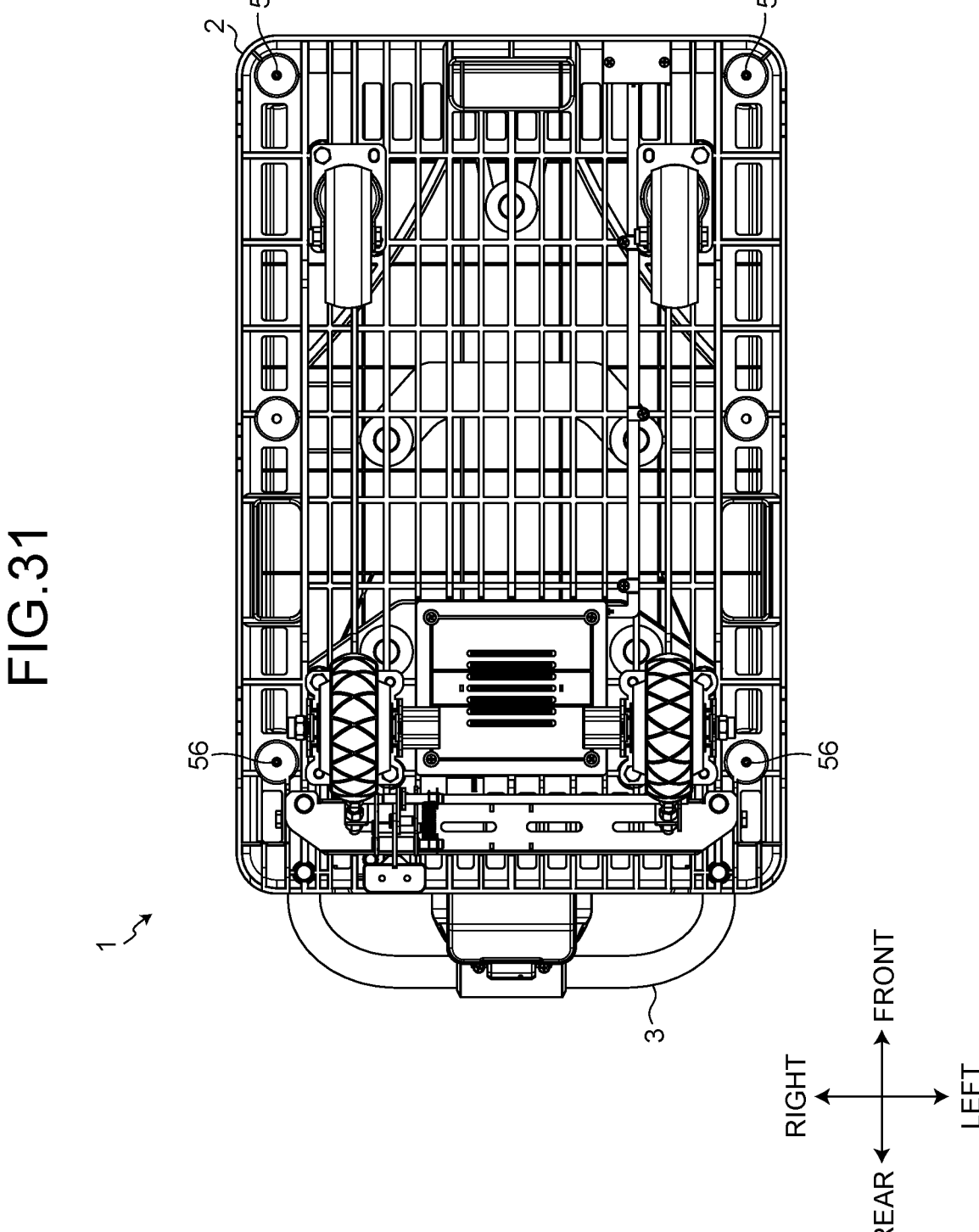
FIG. 31 is a view of the power-assisted trolley mounted with the table according to the embodiment as viewed from below.

FIG. 29 is a front perspective view illustrating the power-assisted trolley 1 mounted with a table 60 according to the embodiment. FIG. 30 is a front perspective view illustrating the table 60 and the power-assisted trolley 1 according to the embodiment. FIG. 31 is a view of the power-assisted trolley 1 mounted with the table 60 according to the embodiment as viewed from below.

The table 60 has four leg portions 61 and two shelves 62. The leg portions 61 are respectively inserted into the recesses 16 of the cargo bed 2. As illustrated in FIG. 31, the leg portions 61 inserted into the recesses 16 are fixed to the cargo bed 2 by screws 56. The screws 56 are inserted into the recesses 16 from the lower surface side of the cargo bed 2 and are inserted into screw holes provided at the lower ends of the leg portions 61.

Effects

In the embodiment, the power-assisted trolley 1 may include: at least three wheels including the drive wheel 5; the cargo bed 2 supported by the wheels; the handle 3 having the grip portion 3C extending in the left-right direction above a rear portion of the cargo bed 2; the motor 7 configured to rotate the drive wheel 5; and the battery mounting portion 27 configured to mount thereon the battery 28 to supply power to the motor 7.

In the above-described configuration, since the battery 28 supplying power to the motor 7 is attached to and detached from the battery mounting portion 27, for example, when the remaining capacity amount of the battery 28 runs out, a user can continue to use the power-assisted trolley 1 by mounting another battery 28 on the battery mounting portion 27. In addition, the battery 28 for the electric tool is easily attached to and detached from the battery mounting portion 27. Therefore, deterioration in convenience of the power-assisted trolley 1 is suppressed.

In the embodiment, the battery mounting portion 27 may be disposed upward of the cargo bed 2.

In the above-described configuration, since the battery mounting portion 27 is disposed at a high position, a user can smoothly attach and detach the battery 28 to and from the battery mounting portion 27.

In the embodiment, the power-assisted trolley 1 may include the left column portion 3A and the right column portion 3B each extending upward from the rear portion of the cargo bed 2. The battery mounting portion 27 may be disposed between the left column portion 3A and the right column portion 3B.

In the above-described configuration, since the battery mounting portion 27 is disposed at the central portion of the power-assisted trolley 1 in the left-right direction, the user can smoothly attach and detach the battery 28 to and from the battery mounting portion 27.

In the embodiment, the power-assisted trolley 1 may include the back plate 4 disposed between the left column portion 3A and the right column portion 3B. The battery mounting portion 27 may be provided at the rear portion of the back plate 4.

In the above-described configuration, since the battery mounting portion 27 is disposed at the rear portion of the back plate 4, the user can smoothly attach and detach the battery 28 to and from the battery mounting portion 27.

In the embodiment, the power-assisted trolley 1 may include the battery case 11 configured to house the battery mounting portion 27. The battery case 11 may be fixed to the rear surface of the back plate 4.

In the above-described configuration, the battery mounting portion 27 and the battery 28 are protected by the battery case 11.

In the embodiment, the battery case 11 may include: the case body 11A fixed to the rear surface of the back plate 4; and the case cover 11B configured to open and close an opening provided in the upper portion of the case body 11A. The battery mounting portion 27 may be disposed on the inner surface of the case body 11A.

In the above-described configuration, the user can smoothly attach and detach the battery 28 to and from battery mounting portion 27 through the opening provided in the upper portion of the case body 11A. In addition, since the opening provided in the upper portion of the case body 11A is closed by the case cover 11B, the battery mounting portion 27 and the battery 28 are protected by the battery case 11.

In the embodiment, the battery mounting portion 27 may be disposed inside the case body 11A so as to face rearward.

In the above-described configuration, the user can smoothly attach and detach the battery 28 to and from the battery mounting portion 27.

In the embodiment, the battery mounting portion 27 may guide the battery 28 in the up-down direction. The battery 28 may be mounted on the battery mounting portion 27 by inserting the battery 28 into the battery mounting portion 27 from above the battery mounting portion 27 through the opening of the case body 11A.

In the above-described configuration, the user can smoothly attach and detach the battery 28 to and from the battery mounting portion 27.

In the embodiment, the power-assisted trolley 1 may include the locking member 37 configured to lock the case body 11A and the case cover 11B.

In the above-described configuration, for example, unintentional opening of the case cover 11B during use of the power-assisted trolley 1 is suppressed.

In the embodiment, the locking member 37 may include: the shaft 37A rotatably supported by the case cover 11B; the hook 37B provided at the lower end portion of the shaft 37A; and the dial 37C disposed on the upper surface of the case cover 11B. When the dial 37C is rotated in one direction in a state where the opening of the case body 11A is closed by the case cover 11B, the hook 37B may be allowed to enter the recess 11E provided inside the case body 11A so as to lock the case body 11A and the case cover 11B.

In the above-described configuration, the user can easily lock the case body 11A and the case cover 11B only by operating the dial 37C.

In the embodiment, the power-assisted trolley 1 may include the controller 14 configured to control the motor 7. The controller 14 may be disposed in the housing portion 29 provided in the cargo bed 2.

In the above configuration, the controller 14 is protected by the cargo bed 2.

In the embodiment, the housing portion 29 may be provided so as to be recessed upward from the lower surface of the cargo bed 2. The power-assisted trolley 1 may include the controller cover 30 configured to close an opening provided in the lower portion of the housing portion 29 in a state where the controller 14 is disposed in the housing portion 29.

In the above-described configuration, the controller 14 is protected by the controller cover 30.

In the embodiment, the controller cover 30 may be fixed to the cargo bed 2 with the screws 31.

In the above-described configuration, the controller cover 30 is prevented from separating from the cargo bed 2.

In the embodiments, the controller cover 30 may have the vent 32.

In the above-described configuration, the controller 14 is cooled by air flowing into the housing portion 29 from the vent 32.

In the embodiment, the power-assisted trolley 1 may include the flexible tube 34 that connects at least one of the left column portion 3A and the right column portion 3B to the cargo bed 2. The battery 28 may supply power to the motor 7 via the controller 14. At least a part of the battery cable that connects the battery mounting portion 27 to the controller 14 may be disposed in the interior space of the flexible tube 34.

In the above-described configuration, the handle 3 can be folded in a state where the connection between the battery mounting portion 27 and the controller 14 by the battery cable is maintained.

In the embodiment, the motor 7 may be an in-wheel motor disposed inside the drive wheel 5.

In the above-described configuration, for example, a gear mechanism configured to transmit a rotational force of the motor 7 to the drive wheel 5 can be omitted.

In the embodiment, the power-assisted trolley 1 may include the cable housing member 36 configured to connect the cargo bed 2 to the drive wheel 5. At least a part of the motor cable that connects the controller 14 to the motor 7 may be disposed in the interior space of the cable housing member 36.

In the above-described configuration, the motor cable is protected by the cable housing member 36.

In the embodiment, the power-assisted trolley 1 may include the headlight 9 that emits light by power supplied from the battery 28.

In the above-described configuration, the user can use the power-assisted trolley 1 in a dark place.

In the embodiment, the headlight 9 may be disposed on the front surface of the cargo bed 2.

In the above-described configuration, the front of the cargo bed 2 is illuminated by the headlight 9.

In the embodiment, the power-assisted trolley 1 may include the taillight 10 that emits light by power supplied from the battery 28.

In the above-described configuration, the position of the power-assisted trolley 1 can be easily visually recognized from the rear side of the power-assisted trolley 1.

Modifications

Figure 32:
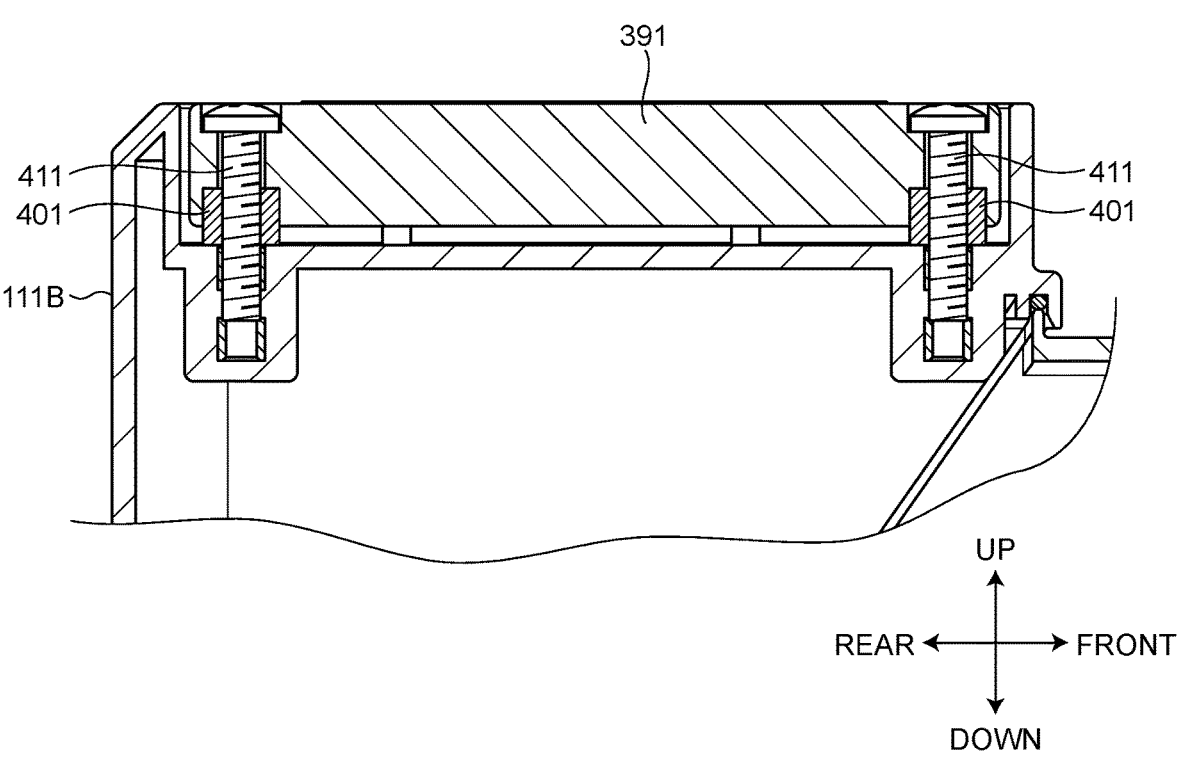
FIG. 32 is a cross-sectional view illustrating a first modification of an angle adjustment mechanism according to the embodiment.

FIG. 32 is a cross-sectional view illustrating a first modification of the angle adjustment mechanism according to the embodiment. FIG. 32 corresponds to a cross-sectional arrow view taken along line C-C of the battery case 11 illustrated in FIG. 17. In the above-described embodiment, the meter case 39 is biased upward by the coil spring 40. In the example illustrated in FIG. 32, an elastic member 401 is an elastic body such as rubber disposed around a screw 411. A meter case 391 may be biased upward with respect to a case cover 111B by the elastic member 401 disposed around the screw 411. Two screws 411 are disposed so as to couple each of the front portion and the rear portion of the meter case 391 to the case cover 111B. Two elastic members 401 are disposed in the front-rear direction. The inclination angle of the meter case 391 is adjusted by adjusting the fastening amount of each of the two screws 411.

Figure 33:
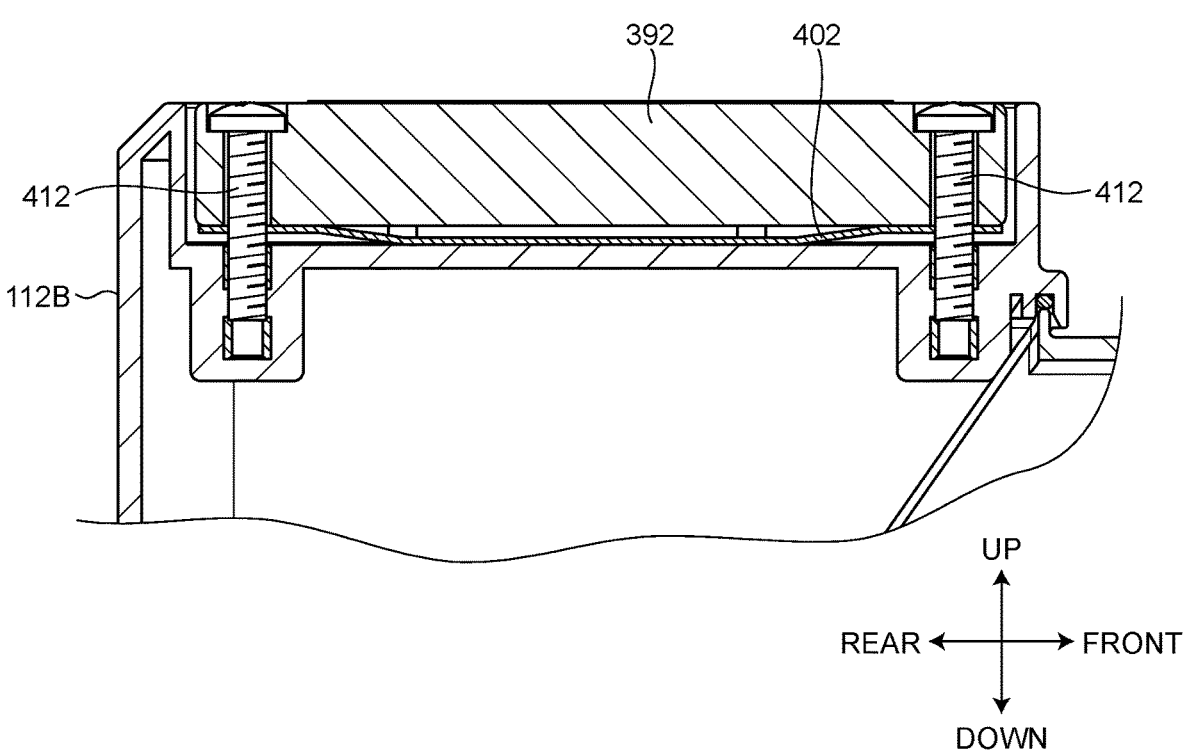
FIG. 33 is a cross-sectional view illustrating a second modification of the angle adjustment mechanism according to the embodiment.

FIG. 33 is a cross-sectional view illustrating a second modification of the angle adjustment mechanism according to the embodiment. FIG. 33 corresponds to a cross-sectional arrow view taken along line C-C of the battery case 11 illustrated in FIG. 17. In the example illustrated in FIG. 33, an elastic member 402 is a leaf spring disposed between the lower surface of a meter case 392 and a case cover 112B. The meter case 392 may be biased upward with respect to the case cover 112B by the elastic member 402. Two screws 412 are disposed so as to couple each of the front portion and the rear portion of the meter case 392 to the case cover 112B. The inclination angle of the meter case 392 is adjusted by adjusting the fastening amount of each of the two screws 412.

Figure 34:
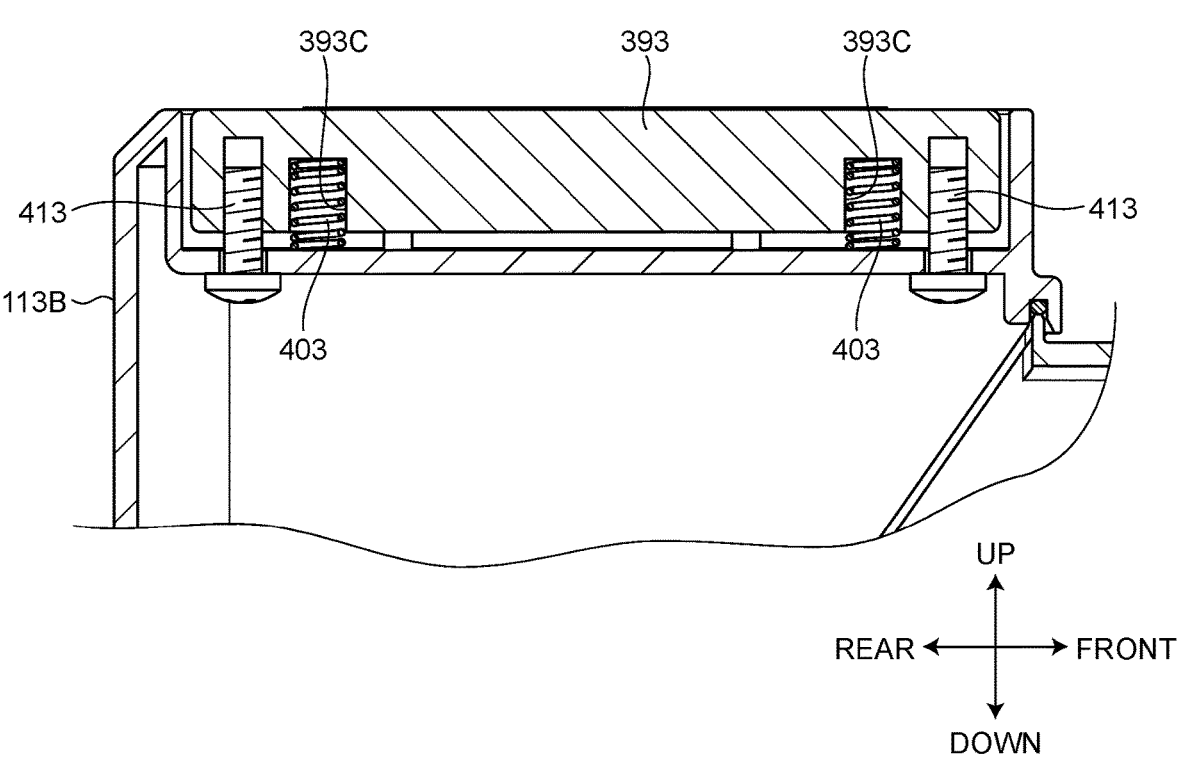
FIG. 34 is a cross-sectional view illustrating a third modification of the angle adjustment mechanism according to the embodiment.

FIG. 34 is a cross-sectional view illustrating a third modification of the angle adjustment mechanism according to the embodiment. FIG. 34 corresponds to a cross-sectional arrow view taken along line C-C of the battery case 11 illustrated in FIG. 17. In the above-described embodiment, the meter case 39 and the case cover 11B are fixed by the screws 41 inserted into the screw openings of the meter case 39 from above the meter case 39. As illustrated in FIG. 34, a meter case 393 and a case cover 113B may be fixed to each other by screws 413 inserted from below the case cover 113B. In the example illustrated in FIG. 34, the meter case 393 is biased upward by coil springs 403 disposed in recesses 393C provided in the lower surface of the meter case 393. Two coil springs 403 are disposed in the front-rear direction.

Figure 35:
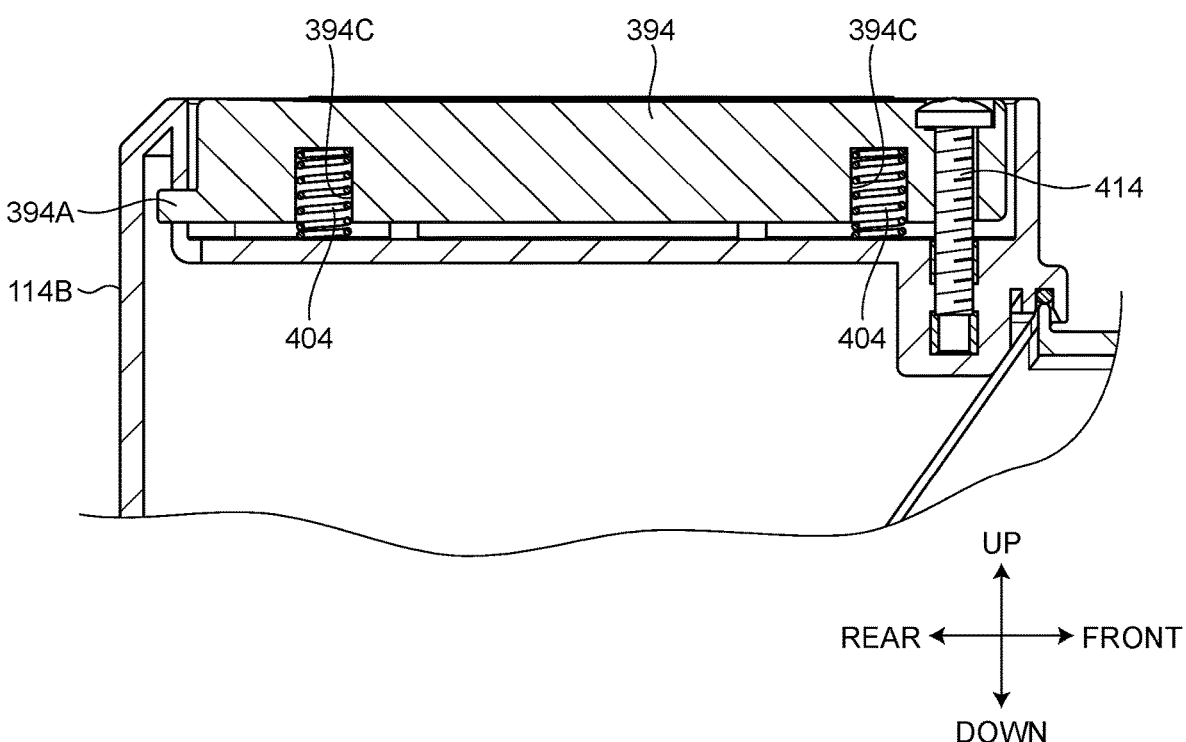
FIG. 35 is a cross-sectional view illustrating a fourth modification of the angle adjustment mechanism according to the embodiment.

FIG. 35 is a cross-sectional view illustrating a fourth modification of the angle adjustment mechanism according to the embodiment. FIG. 35 corresponds to a cross-sectional arrow view taken along line C-C of the battery case 11 illustrated in FIG. 17. As illustrated in FIG. 35, a hook 394A is provided at the rear portion of a meter case 394. The hook 394A is hooked on at least a part of a case cover 114B. One screw 414 is disposed so as to couple the front portion of the meter case 394 to the case cover 114B. The meter case 394 is biased upward by a coil spring 404 disposed in a recess 394C provided on the lower surface of the meter case 394. One coil spring 404 is disposed in the front-rear direction. The inclination angle of the meter case 394 is adjusted by adjusting the fastening amount of one screw 411.

Figure 36:
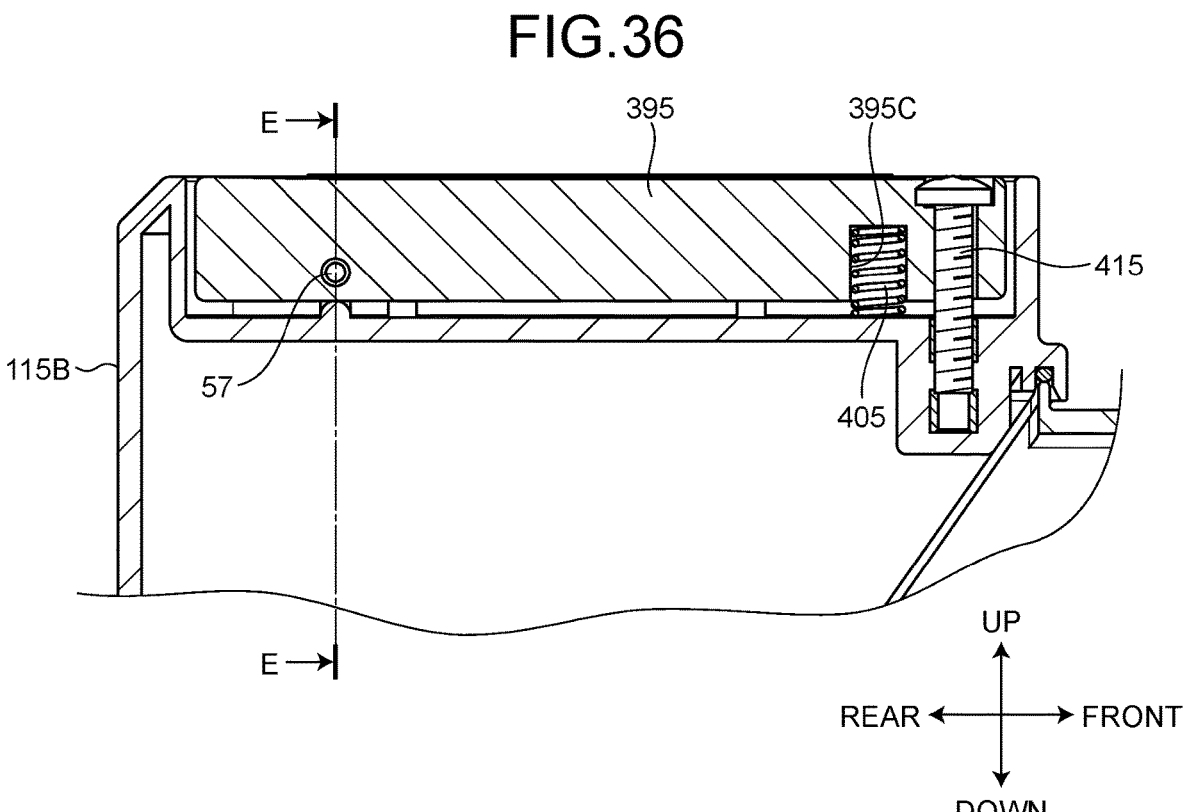
FIG. 36 is a cross-sectional view illustrating a fifth modification of the angle adjustment mechanism according to the embodiment.
Figure 37:
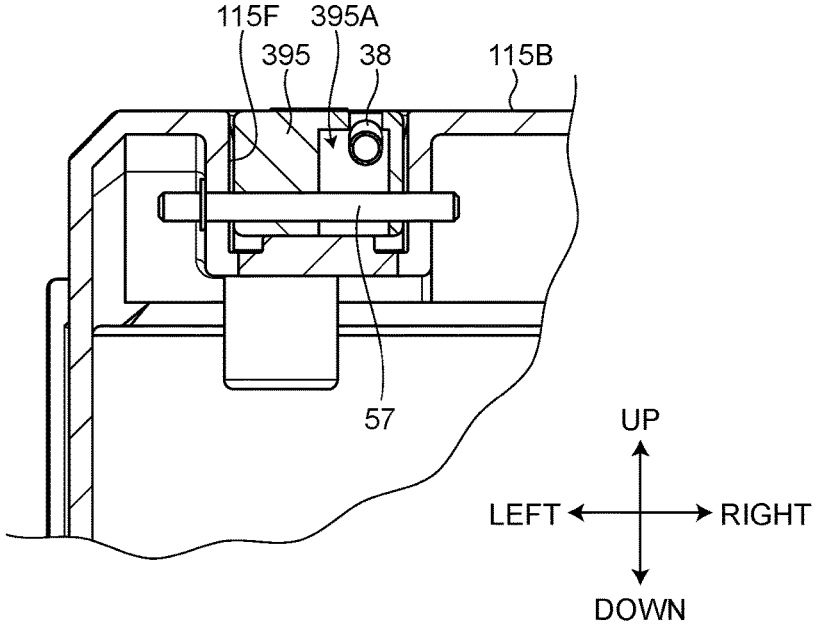
FIG. 37 is a cross-sectional view illustrating the fifth modification of the angle adjustment mechanism according to the embodiment.

Each of FIGS. 36 and 37 is a cross-sectional view illustrating a fifth modification of the angle adjustment mechanism according to the embodiment. FIG. 36 corresponds to a cross-sectional arrow view taken along line C-C of the battery case 11 illustrated in FIG. 17. FIG. 37 corresponds to a cross-sectional arrow view taken along line E-E in FIG. 36. A meter case 395 is disposed in a recess 115F provided in a case cover 115B. The bubble tube 38 is disposed in a housing space 395A of the meter case 395. In the example illustrated in FIGS. 36 and 37, the rear portion of the meter case 395 is rotatably connected to the case cover 115B by a pin 57. The rotary shaft of the pin 57 extends in the left-right direction. One screw 415 is disposed so as to couple the front portion of the meter case 395 to the case cover 115B. The meter case 395 is biased upward by a coil spring 405 disposed in a recess 395C provided on the lower surface of the meter case 395. One coil spring 405 is disposed in the front-rear direction. In the front-rear direction, a distance between the coil spring 405 and the screw 415 is shorter than a distance between the coil spring 405 and the pin 57. The inclination angle of the meter case 395 is adjusted by adjusting the fastening amount of one screw 415.

According to one non-limiting aspect of the present disclosure, deterioration in convenience of an power-assisted trolley is suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power-assisted trolley comprising:
    at least three wheels including a drive wheel;
    a cargo bed supported by the wheels;
    a handle including a grip portion extending in a left-right direction above a rear portion of the cargo bed;
    a motor configured to rotate the drive wheel;
    a battery mounting portion configured to mount thereon a battery for an electric tool to supply power to the motor; and
    a controller configured to control the motor, wherein:
        the controller is disposed in a housing portion provided in the cargo bed, and
        the housing portion is provided so as to be recessed upward from a lower surface of the cargo bed.

2. The power-assisted trolley according to claim 1, wherein: the battery mounting portion is disposed upward of the cargo bed.

3. The power-assisted trolley according to claim 1, further comprising:
    a left column portion and a right column portion each extending upward from the rear portion of the cargo bed, wherein: wherein
    the battery mounting portion is disposed between the left column portion and the right column portion.

4. The power-assisted trolley according to claim 3, further comprising:
    a back plate disposed between the left column portion and the right column portion, wherein:
        the battery mounting portion is provided at a rear portion of the back plate.

5. The power-assisted trolley according to claim 4, further comprising:
    a battery case configured to house the battery mounting portion, the battery case being fixed to a rear surface of the back plate.

6. The power-assisted trolley according to claim 5, wherein:
    the battery case includes:
        a case body fixed to the rear surface of the back plate; and
        a case cover configured to open and close an opening provided in an upper portion of the case body; and
    the battery mounting portion is disposed on an inner surface of the case body.

7. The power-assisted trolley according to claim 6, wherein:
    the battery mounting portion is disposed inside the case body so as to face rearward.

8. The power-assisted trolley according to claim 6, wherein:
    the battery mounting portion is configured to guide the battery in an up-down direction, and the battery is mounted on the battery mounting portion by inserting the battery into the battery mounting portion from above the battery mounting portion through the opening of the case body.

9. The power-assisted trolley according to claim 6, further comprising a locking member configured to lock the case body and the case cover.

10. The power-assisted trolley according to claim 9, wherein:

the locking member includes:

a shaft rotatably supported by the case cover;

a hook provided at a lower end portion of the shaft; and a dial disposed on an upper surface of the case cover, and when the dial is rotated in one direction in a state where the opening of the case body is closed by the case cover, the hook is allowed to enter a recess provided inside the case body so as to lock the case body and the case cover.

11. The power-assisted trolley according to claim 1, wherein:

the power-assisted trolley further comprises a controller cover configured to close an opening provided in a lower portion of the housing portion in a state where the controller is disposed in the housing portion.

12. The power-assisted trolley according to claim 11, wherein the controller cover is fixed to the cargo bed with a screw.

13. The power-assisted trolley according to claim 11, wherein the controller cover includes a vent.

14. The power-assisted trolley according to claim1, further comprising a flexible tube that connects at least one of a left column portion and a right column portion to the cargo bed, wherein:

the battery supplies the power to the motor via the controller, and at least a part of a battery cable that connects the battery mounting portion to the controller is disposed in an interior space of the flexible tube.

15. The power-assisted trolley according to claim 1, wherein the motor is an in-wheel motor disposed inside the drive wheel.

16. The power-assisted trolley according to claim 1, further comprising a headlight that emits light by the power supplied from the battery.

17. The power-assisted trolley according to claim 1, further comprising a taillight that emits light by the power supplied from the battery.

18. A power-assisted trolley comprising:

two front universal wheels and two rear drive wheels;

a cargo bed supported by the two front universal wheels and the two rear drive wheels;

a handle including a grip portion extending in a left-right direction above a rear portion of the cargo bed;

a motor configured to rotate the two rear drive wheels;

a battery mounting portion configured to mount thereon a battery for an electric tool to supply power to the motor; and a controller configured to control the motor and being disposed between the rear drive wheels and battery mounting portion, positioned closer to the rear drive wheels than the front wheels.

19. A power-assisted trolley comprising:

at least three wheels including a drive wheel;

a cargo bed supported by the wheels, including a plurality of recesses configured to receive portions of a table;

a handle including a grip portion extending in a left-right direction above a rear portion of the cargo bed;

a motor configured to rotate the drive wheel;

a battery mounting portion configured to mount thereon a battery for an electric tool to supply power to the motor; and a controller configured to control the motor, wherein:

the controller is disposed in a housing portion provided in the cargo bed; and the housing portion is provided so as to be recessed upward from a lower surface of the cargo bed.

* * * * *